(12) United States Patent
Toma et al.

(10) Patent No.: US 9,497,483 B2
(45) Date of Patent: Nov. 15, 2016

(54) METHOD FOR GENERATING AND DECODING A CODED PICTURE SIGNAL, AN APPARATUS FOR GENERATING AND DECODING A CODED PICTURE SIGNAL, A PROGRAM FOR GENERATING AND DECODING A CODING PICTURE SIGNAL, AND AN INTEGRATED CIRCUIT FOR GENERATING AND DECODING A CODED PICTURE SIGNAL

(75) Inventors: Tadamasa Toma, Osaka (JP); Tomoyuki Okada, Nara (JP); Sam Liu, Mountain View, CA (US); Philip M. Walker, Fort Collins, CO (US); Paul Boerger, Loveland, CO (US)

(73) Assignees: PANASONIC CORPORATION, Osaka (JP); HEWLETT-PACKARD DEVELOPMENT COMPANY L.P., Houston, TX (US)

( * ) Notice: Subject to any disclaimer, the term of this patent is extended or adjusted under 35 U.S.C. 154(b) by 2177 days.

(21) Appl. No.: 11/721,479

(22) PCT Filed: Jan. 6, 2006

(86) PCT No.: PCT/JP2006/000314
§ 371 (c)(1),
(2), (4) Date: Jun. 12, 2007

(87) PCT Pub. No.: WO2006/073207
PCT Pub. Date: Jul. 13, 2006

(65) Prior Publication Data
US 2009/0285284 A1 Nov. 19, 2009

Related U.S. Application Data

(60) Provisional application No. 60/642,147, filed on Jan. 10, 2005.

(51) Int. Cl.
*H04N 11/02* (2006.01)
*H04N 19/587* (2014.01)
(Continued)

(52) U.S. Cl.
CPC .......... *H04N 19/587* (2014.11); *H04N 19/132* (2014.11); *H04N 19/44* (2014.11); *H04N 19/61* (2014.11); *H04N 19/70* (2014.11)

(58) Field of Classification Search
USPC ........................................................ 375/240
See application file for complete search history.

(56) References Cited

U.S. PATENT DOCUMENTS 5,539,466 A * 7/1996 Igarashi et al. .......... 375/240.15
6,282,242 B1 * 8/2001 Isozaki et al. ........... 375/240.04
(Continued)

FOREIGN PATENT DOCUMENTS

JP 2006-157846 6/2006
JP 2007-535187 11/2007
(Continued)

OTHER PUBLICATIONS

"Proposed SMPTE Standard for Television: VC-1 Compressed Video Bitstream Format and Decoding Process," Final Committee Draft 1, Revision 6, Jul. 13, 2005.
(Continued)

*Primary Examiner* — Leron Beck
(74) *Attorney, Agent, or Firm* — Greenblum & Bernstein, P.L.C.

(57) ABSTRACT

The present invention provides a picture coding apparatus which can reduce a load in decoding. When a RAU to be coded is an open GOP type RAU, the present invention includes: a motion estimation unit, a motion compensation unit, and the like which codes a picture to be coded to generate a BI-picture; a BI information generation unit which generates a RAU map indicating whether or not the BI-picture is positioned in a display order immediately before a starting I-picture in the RAU of the stream; and a variable length coding unit which writes the RAU map into the RAU of the stream.

12 Claims, 28 Drawing Sheets

(51) Int. Cl.
  *H04N 19/70* (2014.01)
  *H04N 19/61* (2014.01)
  *H04N 19/132* (2014.01)
  *H04N 19/44* (2014.01)

(56) References Cited

U.S. PATENT DOCUMENTS

| | | | |
|---|---|---|---|
| 7,664,177 B2 * | 2/2010 | Mukerjee | 375/240.13 |
| 7,809,060 B2 | 10/2010 | Toma et al. | |
| 7,843,994 B2 | 11/2010 | Toma et al. | |
| 2002/0090029 A1 * | 7/2002 | Kim | 375/240.03 |
| 2002/0196850 A1 * | 12/2002 | Liu et al. | 375/240.12 |
| 2005/0010632 A1 * | 1/2005 | Lei et al. | 708/670 |
| 2005/0147375 A1 | 7/2005 | Kadono | |
| 2008/0075168 A1 * | 3/2008 | Toma et al. | 375/240.15 |
| 2008/0117988 A1 | 5/2008 | Toma et al. | |
| 2008/0118218 A1 | 5/2008 | Toma et al. | |
| 2008/0118224 A1 | 5/2008 | Toma et al. | |
| 2008/0131079 A1 | 6/2008 | Toma et al. | |
| 2008/0219393 A1 | 9/2008 | Toma et al. | |

FOREIGN PATENT DOCUMENTS

| | | |
|---|---|---|
| JP | 2008-516514 | 5/2008 |
| WO | 2004/066635 | 8/2004 |
| WO | 2005/106875 | 11/2005 |
| WO | 2006/038716 | 4/2006 |

OTHER PUBLICATIONS

U.S. Appl. No. 11/576,085 to Toma et al, filed Mar. 27, 2007.

* cited by examiner

Display Order
PRIOR ART

Decoding Order
PRIOR ART

PRIOR ART

FIG. 9A

```
RAU map {
   num_pic_in_RAU;
   for (i=0; i < num_pic_in_RAU; i++) {
      frame_field_flag;
      pic_type;
   }
}
```
~MI

FIG. 9B

```
RAU map {
   num_frame_in_RAU;
   for (i=0; i < num_frame_in_RAU; i++) {
      field_coding_flag;
      if (field_coding_flag) field_type_mode;
      else picture_type;
   }
}
```
~MI

FIG. 9C

```
RAU map {
   motionless_flag;
   if (motionless_flag ==1) {
      start_pic_num;
      end_pic_num;
   }
}
```
~MI

FIG. 9D

```
EPS_structure_map () {
      number_of_pictures_in_EPS;
      for (i=0; i < number_of_pictures_in_EPS; i++) {
         // decoding order
               stuffing_bits    ;
               picture_structure;
               picture_type     ;
      }
}
```
MI (MIa)

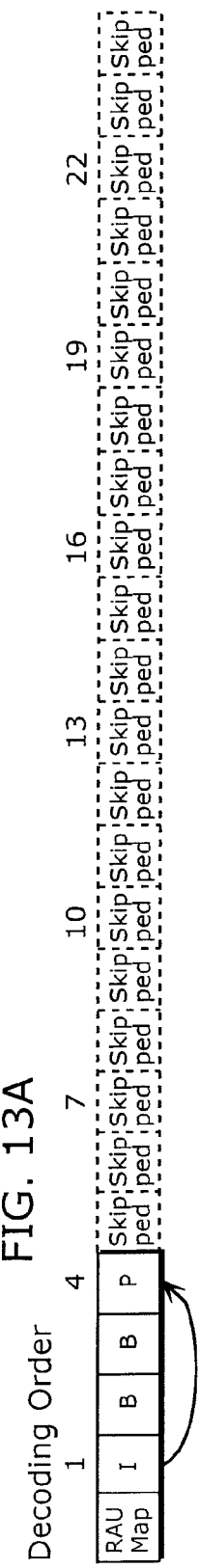

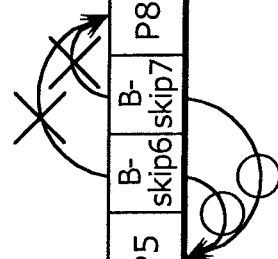

Display Order

FIG. 21

```
RAU map {                                    ⟋MIa independent_decodable_flag ;
    if(independent_decodable_flag==1) { num_decodable_pictures ;

}

}
``` and decoding a coded picture signal, an apparatus for generating and decoding a coded picture signal, a program for generating and decoding a coding picture signal, and an integrated circuit for generating and decoding a coded picture signal

CROSS-REFERENCE TO RELATED APPLICATIONS

This application claims the benefit of U.S. Provisional Application No. 60/642,147, filed Jan. 109, 2005, the entire content of which is expressly incorporated in its entirety.

TECHNICAL FIELD

The present invention relates to a picture coding apparatus which codes a moving picture, a stream which is generated by an image coding method using the picture coding apparatus, and a picture decoding apparatus which decodes the stream.

BACKGROUND ART

Recently, with the arrival of the age of multimedia which integrally handles audio, video and pixel values, existing information media, for example, newspaper, journal, Television, radio and telephone, and other means through which information is conveyed to people, has come under the scope of multimedia. In general, multimedia refers to a representation in which not only characters but also graphic symbols, audio and especially pictures and the like are related to each other. However, in order to include the aforementioned existing information media in the scope of multimedia, it appears as a prerequisite to represent such information in digital form.

However, when estimating the amount of information contained in each of the aforementioned information media in digital form, the information amount per character requires 1 to 2 bytes whereas audio requires more than 64 Kbits per second (telephone quality), and a moving picture requires more than 100 Mbits per second (present television reception quality). Therefore, it is not realistic to handle the vast amount of information directly in digital form via the information media mentioned above. For example, a videophone has already been put into practical use via Integrated Services Digital Network (ISDN) with a transmission rate of 64 Kbits/sec to 1.5 Mbits/sec, however, it is impossible to transmit a picture captured by a TV camera.

This therefore requires information compression techniques, and for instance, in the case of a videophone, video compression techniques compliant with H.261 and H.263 Standards recommended by International Telecommunication Union-Telecommunication Standardization Sector (ITU-T) are employed. According to the information compression techniques compliant with the MPEG-1 standard, picture information as well as audio information can be stored in an ordinary music CD (Compact Disc).

Here, Moving Picture Experts Group (MPEG) is an international standard for a compression of moving picture signals and the MPEG-1 is a standard that compresses video signals down to 1.5 Mbit/s, namely, to compress the information included in TV signals approximately down to a hundredth. The quality targeted by the MPEG-1 standard was medium quality so as to realize a transmission rate primarily of about 1.5 Mbits/sec, therefore, MPEG-2, standardized with the view to meeting the requirements of even higher quality picture, realizes a TV broadcast quality for transmitting moving picture signals at a transmission rate of 2 to 15 M bits/sec.

In the present circumstances, a working group (ISO/IEC JTC1/SC29/WG11) previously in charge of the standardization of the MPEG-1 and the MPEG-2 has further standardized MPEG-4 which achieves a compression rate superior to the one achieved by the MPEG-1 and the MPEG-2, allows coding/decoding operations on a per-object basis and realizes a new function required by the age of multi media. At first, in the process of the standardization of the MPEG-4, the aim was to standardize a low bit rate coding, however, the aim is presently extended to a more versatile coding including a high bit rate coding for interlaced pictures and others. Moreover, the ISO/IEC and the ITU-T have jointly developed, as a next-generation image coding method, a standardization of MPEG-4 Advanced Video Coding (AVC) with a higher compression rate, and currently Society of Motion Picture and Television Engineers (SMPTE) attempts to standardize a VC-1 (Proposed SMPTE Standard for Television: VC-1 Compressed Video Bitstream Format and Decoding Process, Final Committee Draft 1 Revision 6, 2005.7.13). A target of the VC-1 is to extend a coding tool and the like, based on the methods of the MPEG-2 and MPEG-4 standards. The VC-1 is expected to be used for next-generation optical disk peripheral devices, such as a Blu-ray disc (BD) and a High Definition (HD) DVD.

In general, in coding of a moving picture, compression of information volume is performed by eliminating redundancy both in spatial and temporal directions. Therefore, an inter-picture prediction coding, which aims at reducing the temporal redundancy, estimates a motion and generates a predicted picture on a block-by-block basis with reference to prior and subsequent pictures, and then codes a differential value between the obtained predicted picture and a current picture to be coded. Here, "picture" is a term to represent a single screen and it represents a frame when used for a progressive picture whereas it represents a frame or fields when used for an interlaced picture. The interlaced picture here is a picture in which a single frame consists of two fields respectively having different time. For coding and decoding an interlaced picture, three ways are possible: processing a single frame either as a frame, as two fields or as a frame/field structure depending on a block in the frame.

A picture to which an intra-picture prediction coding is performed without reference pictures is referred to as an "I-picture". A picture to which the inter-picture prediction coding is performed with reference to a single picture is referred to as a "P-picture". A picture to which the inter-picture prediction coding is performed by referring simultaneously to two pictures is referred to as a "B-picture". The B-picture can refer to two pictures, arbitrarily selected from the pictures whose display time is either forward or backward to that of a current picture to be coded, as an arbitrary combination. However, the reference pictures need to be already coded or decoded as a condition to code or decode these I-picture, P-picture, and B-picture.

FIGS. 1A and 1B are diagrams showing a structure of the conventional MPEG-2 stream. As shown in FIG. 1B, the stream according to the MPEG-2 standard has a layered system. The stream is made up of a plurality of Group of Pictures (GOP). It is possible to edit a moving picture and to perform random access on it by using the GOP as a basic unit used in coding processing. This means that a starting picture in the GOP is a random access point. The GOP consists of a plurality of pictures, each being I-picture, P-picture and B-picture. The stream, GOP and picture respectively include a synchronous signal (sync) indicating a boundary between respective units and a header that is data commonly included in the respective units.

FIGS. 2A and 2B are examples of a prediction structure of pictures according to the MPEG-2 standard. Shaded pictures in FIG. 2A are reference pictures which are referred to predict other pictures. As shown in FIG. 2A, in the MPEG-2 standard, P-picture (picture P0, P6, P9, P12, or P15) can be predicted from one picture, either I-picture or P-picture, whose display time immediately precedes that of the P-picture. B-picture (picture B1, B2, B4, B5, B7, B8, B10, B11, B13, B14, B16, B17, B19, or B20) can be predicted from one picture whose display time immediately precedes the B-picture or one picture whose display time immediately follows the B-picture, both of which can be either I-picture or P-picture. The positions of the B-pictures are arranged in the stream, either immediately after I-picture or P-picture. Therefore, at the time of performing random access, all the pictures after I-picture can be decoded and displayed, when decoding starts from I-picture. Regarding a structure of the GOP, the pictures from I3 to B14 can be considered as one GOP, as shown in FIG. 2B for example.

FIG. 3 is a diagram showing a structure of a stream according to the VC-1. The stream according to the VC-1 also has the same structure as described for the MPEG-2 standard. However, a random access point is referred to as an "entry point" which is added with an entry point header (Entry Point HDR). Data from the entry point to a next entry point is a random access unit (RAU), which is equivalent to one GOP according to the MPEG-2 standard. Hereafter, the RAU according to the VC-1 is referred to as a "random access point (RAU)". Note that the RAU can store user data regarding pictures in the RAU (user data at Entry-point level), and the RAU is arranged immediately after the entry point header.

Here, types of pictures according to the VC-1 are described. In the VC-1, the I-picture, P-picture, and B-picture are also defined. These I-picture, P-picture, and B-picture have the same prediction structure as described for the MPEG-2 standard. In the VC-1, in addition to the above three types of picture, there are two more defined types, which are Skipped-picture and BI-picture. The Skipped-picture is a picture which does not include any pixel data, and treated as a P-picture having the same pixel data of a prior reference picture in decoding order. For example, in examples of (1) and (2), a picture S5 is regarded the same picture as a picture P3, so that the same operation of decoding the stream is performed in both (1) and (2).

(1) Display order: Picture I0, Picture B2, Picture P1, Picture B4, Picture P3, Picture B6, Picture S5 (Note that the picture represented by a symbol including I is an I-picture, the picture represented by a symbol including P is a P-picture, the picture represented by a symbol including B is a B-picture, and the picture represented by a symbol including S is a Skipped-picture. For example, the picture S6 is a Skipped-picture. The numerals attached to the symbols of the pictures represent decoding order.)

(2) Display order: Picture I0, Picture B2, Picture P1, Picture B4, Picture P3, Picture B6, Picture P5 (P5 has the same pixel data as P3.)

The Skipped-picture is especially useful when pictures are still. For example, in a case where the pictures are still in the middle of the RAU, Skipped-pictures are used where the pictures are still, for example, where there are picture I0, picture P1, picture P2, picture P3, picture S4, picture S5, picture S6 . . . , in order to reduce an amount of data to be coded.

Furthermore, BI-picture is a picture having characteristics of the B-picture and I-picture. More specifically, the BI-picture has the B-picture characteristics in which decoding order is different from display order (re-ordering of the BI-picture and an I- or P-picture is necessary. For example, BI-picture precedes in display order a starting intra-coded picture in an RAU and follows in decoding order the starting intra-coded picture in the RAU), and the picture is not a reference picture for other pictures. In addition, the BI-picture has the I-picture characteristics in which all macroblocks are intra-coded and the picture is not predicted from any other pictures.

Next, a method for distinguishing the I-picture, P-picture, B-picture, Skipped-picture, and BI-pictures is described. Basically, the types of pictures can be distinguished based on the picture types included in a picture layer in a stream. However, the picture types indicated by the picture layer are defined as following, depending on profiles.

For example, in a simple profile, picture types are indicated as I-picture and P-picture. In a main profile, picture types are indicated as I-picture, P-picture, and B- or BI-picture. In an advanced profile, picture types are indicated as I-picture, P-picture, B-picture, BI-picture, and Skipped-picture.

Here, in both of the simple profile and the main profile, it is impossible to distinguish the Skipped-picture by using the picture types in the picture layer, so that, in a case where an arbitrary picture has a size of one or less byte, the picture is defined as the Skipped-picture. Furthermore, in the main profile, one picture type indicates that a picture is a B-picture or a BI-picture, so that it is impossible to distinguish B-picture from BI-picture, based on the picture type.

FIG. 4 is a block diagram showing a picture coding apparatus for realizing the conventional image coding method.

A picture coding apparatus 800 performs compressed coding, variable length coding, and the like, for an inputted picture signal Vin, thereby transforming the picture signal Vin into a bitstream (stream) Str to be outputted. The picture coding apparatus 800 includes a motion estimation unit 801, a motion compensation unit 802, a subtractor 803, an orthogonal transformation unit 804, a quantization unit 805, an inverse quantization unit 806, an inverse orthogonal transformation unit 807, an adder 808, a picture memory 809, a switch 810, a variable length coding unit 811, and a prediction structure determination unit 812.

The picture signal Vin is inputted into the subtractor 803 and the motion estimation unit 801. The subtractor 803 calculates a differential between the inputted picture signal Vin and a predicted picture, and outputs the differential to the orthogonal transformation unit 804. The orthogonal transformation unit 804 transforms the differential into a frequency coefficient, and outputs the frequency coefficient into the quantization unit 805. The quantization unit 805 quantizes the inputted frequency coefficient, and outputs the resulting quantization value Qc into the variable length coding unit 811.

The inverse quantization unit 806 inversely quantizes the quantization value Qc in order to restore the original frequency coefficient, and outputs the resulting frequency coefficient to the inverse orthogonal transformation unit 807. The inverse orthogonal transformation unit 807 performs inverse-frequency transformation on the frequency coefficient to be transformed into a pixel differential, and outputs the pixel differential to the adder 808. The adder 808 adds the pixel differential with a predicted picture which is outputted from the motion compensation unit 802, and generates a decoded picture. The switch 810 is On when the decoded picture is instructed to be stored, and the decoded picture is stored into the picture memory 809.

On the other hand, the motion estimation unit 801, in which the picture signal Vin is inputted in units of macroblocks, searches the decoded pictures (reference pictures) which are stored in the picture memory 809, detects an image having the most similar image to a macroblock indicated by the picture signal Vin, and determines a motion vector MV for indicating a location of the image.

The motion compensation unit 802, by using the determined motion vector and the like, retrieves the most suitable image for a predicted picture, from the decoded picture stored in the picture memory 809.

A prediction structure determination unit 812 determines, based on a RAU start picture Uin, that a picture to be coded is at a RAU start position, then instructs, using a picture type Pt, the motion estimation unit 801 and the motion compensation unit 802 to code (inter-picture coding) the picture as a special randomly-accessible picture, and further instructs the variable length coding unit 811 to code the picture type Pt.

The variable length coding unit 811 performs variable length coding on the quantization value Qc, the picture type Pt, and the motion vector MV in order to generate a stream Str.

FIG. 5 is a block diagram showing a picture decoding apparatus 900 for realizing the conventional image decoding method. The reference numerals in FIG. 4 are assigned to identical units in FIG. 5, and the those units operate in the same manner as described for the picture coding apparatus for realizing the conventional image coding method in FIG. 4, so that the details of those units are not described herein below.

The variable length decoding unit 901 decodes the stream Str, and outputs the quantization value Qc, a reference picture specification information Ind, the picture type Pt, the motion vector MV, and the like. The picture memory 809 obtains the movement vector MV, the motion compensation unit 802 obtains the picture type Pt, the movement vector MV, and the reference picture specification information Ind, and the inverse quantization unit 806 obtains the quantization value Qc. The decoding is performed by the picture memory 809, the motion compensation unit 802, and the inverse quantization unit 806, the inverse orthogonal transformation unit 807, and the adder 808. The operation of the decoding has been described with reference to the block diagram of FIG. 4 showing the picture coding apparatus 800 for realizing the conventional coding method.

A buffer memory 902 is a memory for storing a decoded picture Vout which is outputted from the adder 808, and a display unit 903 obtains the decoded picture Vout from the buffer memory 902 and displays a picture according to the decoded picture Vout. Note that the buffer memory 809 and the picture memory 902 can share the same memory.

FIG. 6 is a flowchart showing decoding during special play-back, such as high-speed play-back, performed by the conventional picture decoding apparatus 900. Firstly, the conventional picture decoding apparatus 900 detects, from the stream Str, a header of a picture to be decoded at Step S1001. Then at Step 1002, the conventional picture decoding apparatus 900 examines, based on a picture type in the header included in the picture layer, whether or not the starting picture needs to be decoded. At Step S1003, the conventional picture decoding apparatus 900 determines whether or not the picture is examined to be decoded at Step 1002, and if the decoding needs to be decoded, then the processing proceeds to Step S1004, while if the picture does not need to be decoded, then the processing proceeds to Step S1005. Finally, at Step S1005, the conventional picture decoding apparatus 900 determines whether or not the processing completes even for a last picture to be play-backed, such as a last picture in a RAU or a stream, and if there are still pictures to be processed, the processing repeats the steps from Step S1001 to S1005, and if the last picture is processed, the processing completes.

However, in the above conventional picture coding apparatus 800 and picture decoding apparatus 900, there is a problem of a large amount of processing load, during coding the stream Str which includes Skipped-pictures, and especially during the special play-back such as high-speed play-back. Furthermore, in decoding of the stream Str including BI-pictures, especially in special play-back such as play-back performed from the middle of entire data (hereinafter, referring to as jumping play-back), there is the same problem as described above that a large amount of processing load is required.

FIG. 7 is a diagram showing the problem of the above-described conventional picture coding apparatus 800 and picture decoding apparatus 900.

In (a) of FIG. 7, a structure of the conventional RAU including the Skipped-pictures is shown. The RAU includes twenty-four pictures in which the images are still in the fourth and following pictures in decoding order, so that the fifth and later pictures are all Skipped-pictures. When such a RAU is play-backed at triple speed, the conventional picture decoding apparatus 900 attempts to decode the 1st, 4th, 7th, 10th, 13th, 16th, 19th and 22nd pictures, sequentially to be play-backed. However, pictures to be practically decoded are only first I-picture and the fourth P-picture as shown in (c) of FIG. 7.

This means that, in a RAU in the conventional stream Str, the picture decoding apparatus 900 cannot determine whether or not the pictures are to be decoded, unless a head of each picture (picture layer) is searched to obtain a picture type, since each picture layer includes a picture type of the picture. Therefore, as shown in (b) of FIG. 7, the picture decoding apparatus 900 needs to analyze the 7th, 10th, 13th, 16th, 19th and 22nd Skipped-pictures to obtain the picture types.

As described above, for the high-speed play-back of the conventional RAU, the conventional picture coding apparatus and picture decoding apparatus need to analyze even pictures which do not need to be decoded, which eventually results in a large amount of data for decoding.

Furthermore, when jumping play-back is performed from a RAU including BI-pictures, the above conventional picture coding apparatus 800 and picture decoding apparatus 900 require a large processing amount in decoding.

This means that, in the conventional picture coding apparatus 800, when an open GOP type RAU is generated, it is a possibility that a picture (hereinafter, referred to as a re-ordered picture) is encoded as a B-picture or a BI-picture. Note that the re-ordered picture is positioned in a display order before a starting I-picture that is positioned in a decoding order as the first picture in the RAU, but the re-ordered picture is positioned in the decoding order after the starting I-picture. Here, when the jumping play-back is performed from the open GOP type RAU, if the above re-ordered picture is a B-picture, there is a case that it is impossible to decode nor display the B-picture. However, if the re-ordered picture is a BI-picture, it is possible to decode and display the BI-picture.

Therefore, the conventional picture decoding apparatus 900 analyzes each re-ordered picture included in the RAU in the stream Str, thereby determining whether the re-ordered picture is a B-picture or a BI-picture. If the re-ordered picture is a B-picture, then the picture decoding apparatus 900 does not decode the re-ordered picture. On the other hand, if the re-ordered picture is a BI-picture, then the picture decoding apparatus 900 decodes the re-ordered picture.

However, the above determination of whether the re-ordered picture is a B-picture or a BI-picture requires a large processing amount, which sometimes result in delay of the processing.

Therefore, when jumping play-back is performed from the open GOP type RAU, the conventional picture decoding apparatus 900 does not decode nor display the re-ordered picture, regardless of whether the re-ordered picture is a B-picture or a BI-picture, without any specific necessity. As a result, when the re-ordered picture is a BI-picture, it has been impossible to effectively play-back such a BI-picture.

Thus, the present invention addresses the above problems and an object of the present invention is to provide a picture coding apparatus and a picture decoding apparatus which can reduce load in decoding.

DISCLOSURE OF INVENTION

In order to solve the above problems, the present invention provides a picture coding apparatus which generates a coded picture signal by coding each picture in each access unit which includes one or more pictures, said picture coding apparatus comprising: a coding unit operable to code a picture to be coded to generate an independent picture which is positioned in a display order before a starting picture in the access unit of the coded picture signal and which is able to be decoded independently without referring to any other picture, when the access unit is an open type access unit which is able to be coded by referring to another access unit; an information generation unit operable to generate supplementary information which indicates for the access unit of the coded picture signal whether or not the independent picture is positioned in the display order immediately before the starting picture; and a writing unit operable to write the supplementary information generated by said information generation unit into the access unit of the coded picture signal.

Thereby since a RAU as the access unit stores the supplementary information (RAU map), the picture decoding apparatus can easily determine by referring to the RAU map whether or not a BI-picture as the independent picture is positioned in the display order immediately before a starting I-picture as the starting picture in the decoding order in the RAU, during jumping play-back, for example. As a result, if the BI picture is not positioned immediately before the starting picture, the picture decoding apparatus can speedily extract, from pictures included in the RAU, the starting I-picture and pictures positioned after the starting I-picture, as pictures to be decoded. Furthermore, if the BI picture is positioned immediately before the starting picture, the picture decoding apparatus can speedily extract, from pictures included in the RAU, also the BI-picture as the picture to be decoded Therefore, the picture decoding apparatus does not need to conventionally analyze each picture layer of the pictures included in the RAU nor determine whether a picture of the layer is a B-picture or a BI-picture, so that it is possible to reduce load of the decoding processing. Furthermore, when the BI-picture is positioned in display order immediately before the starting I-picture, the BI-picture is able to be easily decoded and displayed, so that it is possible to use the BI-picture effectively.

Further, said information generation unit may generate the supplementary information which includes a flag indicating whether or not the independent picture is positioned in the display order immediately before the starting picture, and the number of the consecutive independent pictures positioned in the display order immediately before the starting picture.

Thereby, since the RAU map as the supplementary information includes the flag and the number of the consecutive pictures, the picture decoding apparatus can easily determine by referring to the flag and the number included in the RAU whether or not there are one or more consecutive independent pictures positioned in the display order immediately before the starting picture in the RAU of the stream. As a result, when the determination is made that there are the one or more consecutive independent pictures, the picture decoding apparatus can speedily extract from the pictures included in the access unit the one or more consecutive BI-pictures and pictures positioned in the display order after the BI-pictures, as the pictures to be decoded. On the other hand, when the determination is made that the one or more consecutive independent pictures do not exist, the picture decoding apparatus can speedily extract from the pictures included in the access unit the starting I-picture and pictures positioned in the display order after the starting I-picture, as the pictures to be decoded.

Still further, said information generation unit may generate the supplementary information which indicates in a decoding order or in the display order a picture type of the each picture included in the access unit of the coded picture signal.

Thereby, since the RAU map as the supplementary information includes a picture type of each picture, the picture decoding apparatus can easily determine by referring to the picture type indicated by the RAU map whether or not there are one or more consecutive independent pictures positioned in the display order immediately before the starting picture in the RAU of the stream. As a result, when the determination is made that there are the one or more consecutive independent pictures, the picture decoding apparatus can speedily extract from the pictures included in the access unit the one or more consecutive BI-pictures and pictures positioned in the display order after the BI-pictures, as the pictures to be decoded. On the other hand, when the determination is made that the one or more consecutive independent pictures do not exist, the picture decoding apparatus can speedily extract from the pictures included in the access unit the starting I-picture and pictures positioned in the display order after the starting I-picture, as the pictures to be decoded.

Still further, said writing unit may write the supplementary information at a position before any picture included in the access unit of the coded picture signal.

Thereby, since the RAU map as the supplementary information is written at a position before any picture in the RAU, the picture decoding apparatus can easily and speedily detect the RAU map by obtaining data of the RAU from the beginning of the RAU, so that it is possible to reduce load of the decoding processing.

Here, in order to achieve the above object, the present invention provides a picture decoding apparatus which decodes a coded picture signal in which each access unit includes one or more pictures, the access unit of the coded picture signal storing supplementary information which indicates whether or not an independent picture is positioned in a display order immediately before a starting picture in the access unit, and the independent picture being positioned in a display order before the starting picture and being able to be decoded independently without referring to any other picture, said picture decoding apparatus comprising: a type determination unit operable to determine whether or not the access unit is an open type access unit which is able to be decoded by referring to another access unit; an information obtainment unit operable to obtain the supplementary information from the access unit, when said type determination unit determines that the access unit is the open type access unit; an extraction unit operable to extract from the access unit a picture to be decoded by referring to the supplementary information obtained by said information obtainment unit; and a decoding unit operable to decode the picture extracted by said extraction unit.

Thereby, when the RAU as the access unit is the open GOP type RAU, the picture decoding apparatus obtains the RAU map as the supplementary information and refers to the RAU map, so that the picture decoding apparatus can easily determine whether or not the BI-picture as the independent picture is positioned in the display order immediately before the starting I-picture that is positioned in the decoding order as the first picture. As a result, when the BI-picture is positioned immediately before the starting I-picture, the picture decoding apparatus can speedily extract the BI-picture as a picture to be decoded. On the other hand, when the BI-picture is not positioned immediately before the starting I-picture, the picture decoding apparatus can speedily determine that the BI-picture is not a picture to be decoded. As a result, it is possible to reduce load of the decoding processing.

Note that the present invention can be realized not only as the above described picture coding apparatus and picture decoding, and image coding signal, but also as an image coding method, an image decoding method, a program, a storage medium which stores the program, and an integrated circuit which includes the above devices.

BRIEF DESCRIPTION OF DRAWINGS

These and other objects, advantages and features of the invention will become apparent from the following description thereof taken in conjunction with the accompanying drawings that illustrate specific embodiments of the present invention. In the Drawings:

FIG. 9A is a diagram showing an example of a syntax of a RAU map MI;

FIG. 9B is a diagram showing another example of the syntax of the RAU map MI;

FIG. 9C is a diagram showing still another example of the syntax of the RAU map MI;

FIG. 9D is a diagram showing still further example of the syntax of the RAU map MI;

FIG. 13A is a diagram showing a RAU which is play-backed at a high speed by the picture decoding apparatus according to the first embodiment of the present invention;

FIG. 13B is a diagram showing a RAU map MI according to FIG. 13A;

FIGS. 19A and 19B are diagrams showing a prediction structure of a B-skip picture;

FIG. 21 is a diagram showing another example of a syntax of the RAU map according to the third embodiment of the present invention;

BEST MODE FOR CARRYING OUT THE INVENTION

The following describes embodiments according to the present invention with reference to the drawings.

First Embodiment

A RAU map is stored at the beginning of a RAU in a VC-1 stream according to the first embodiment of the present invention, and a picture decoding apparatus according to the first embodiment specifies a still picture sequence in the RAU by analyzing the RAU map.

Figure 1A:
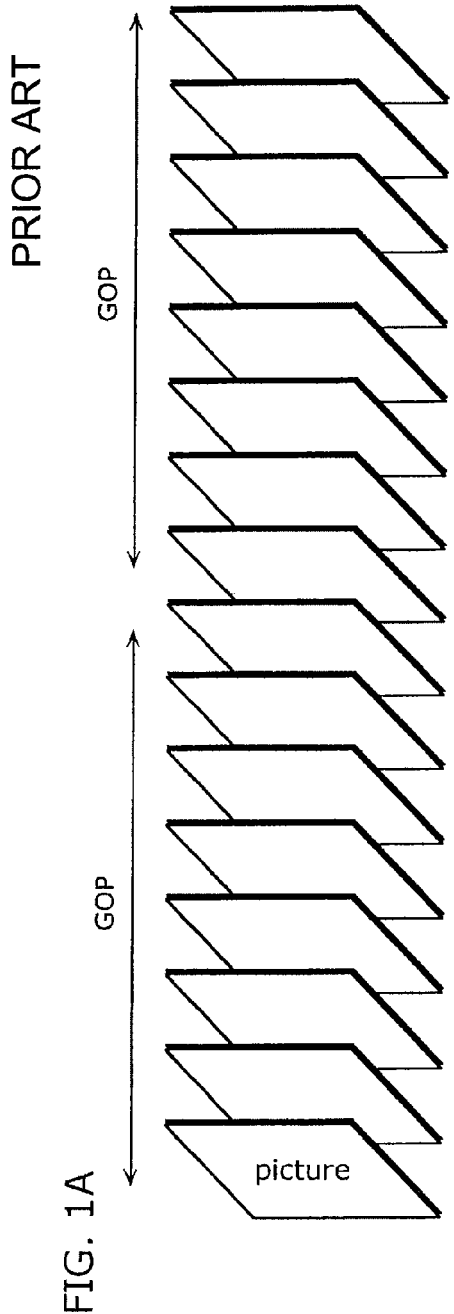
FIGS. 1A and 1B are diagrams showing a structure of the MPEG 2 stream.
Figure 1B:
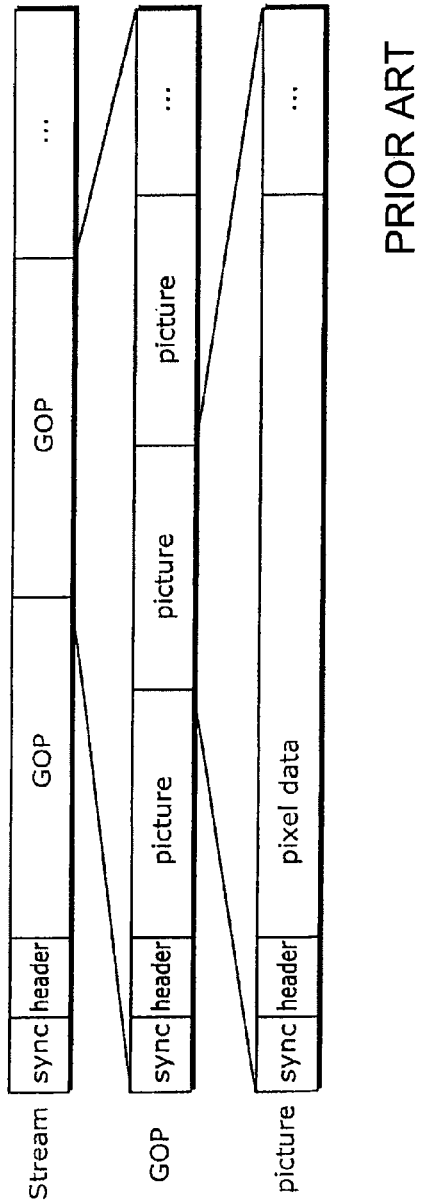
Figure 2A:
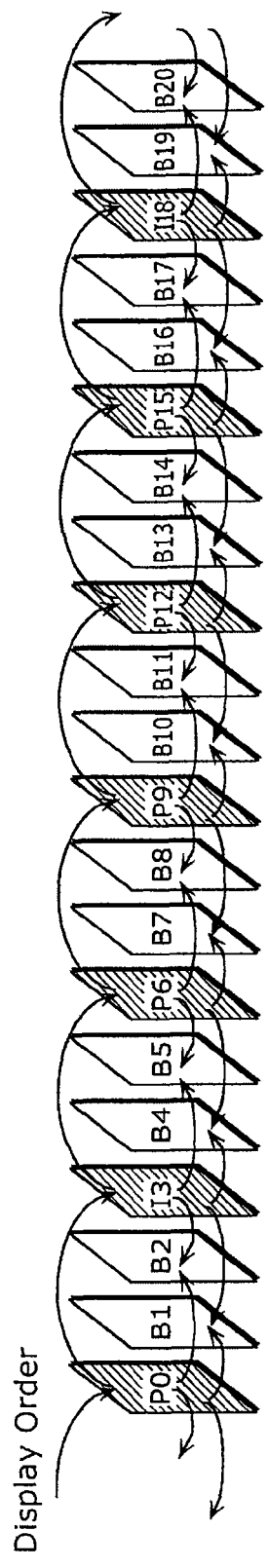
FIGS. 2A and 2B are diagrams showing examples of a prediction structure between pictures used in the MPEG 2 standard.
Figure 2B:
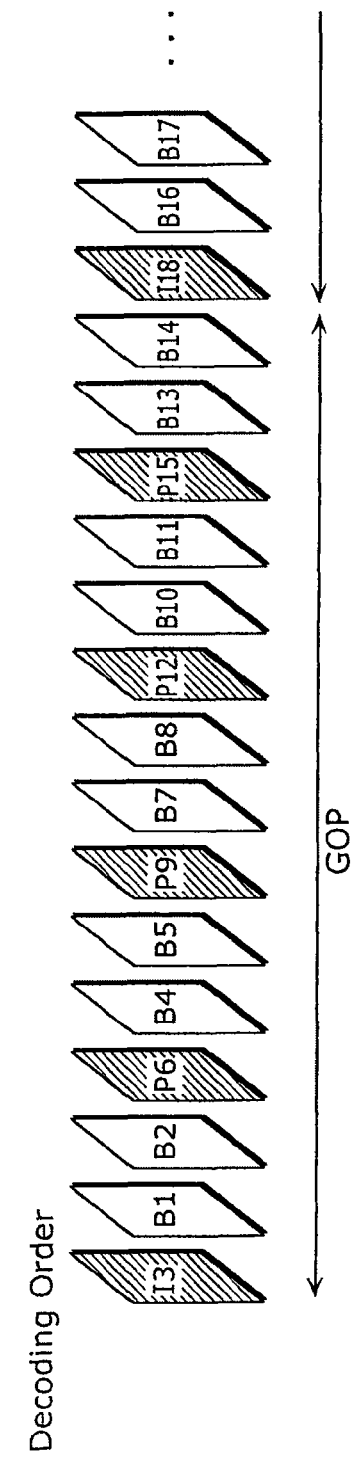
Figure 3:
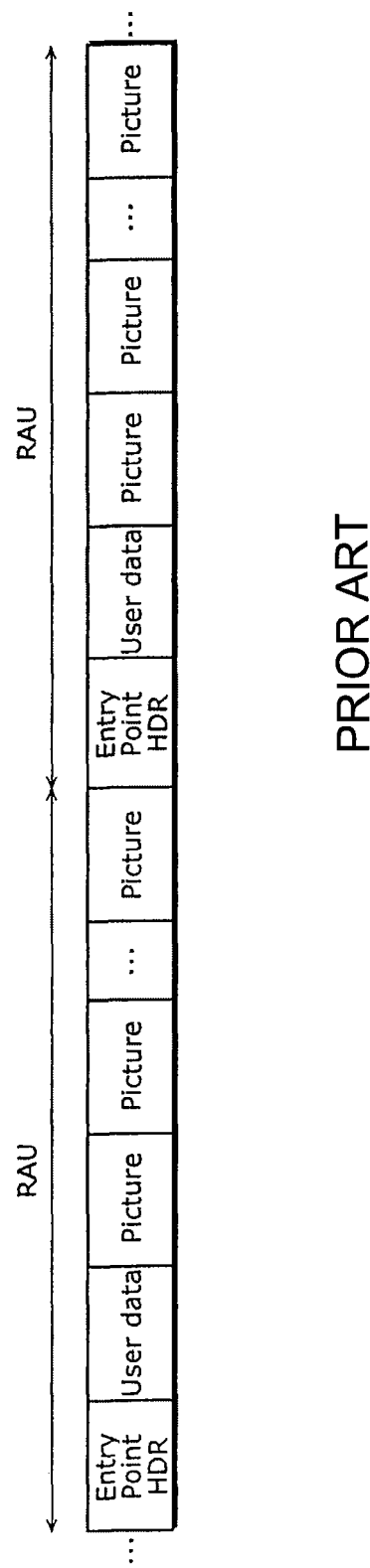
FIG. 3 is a diagram showing a structure of the conventional VC-1 stream.
Figure 4:
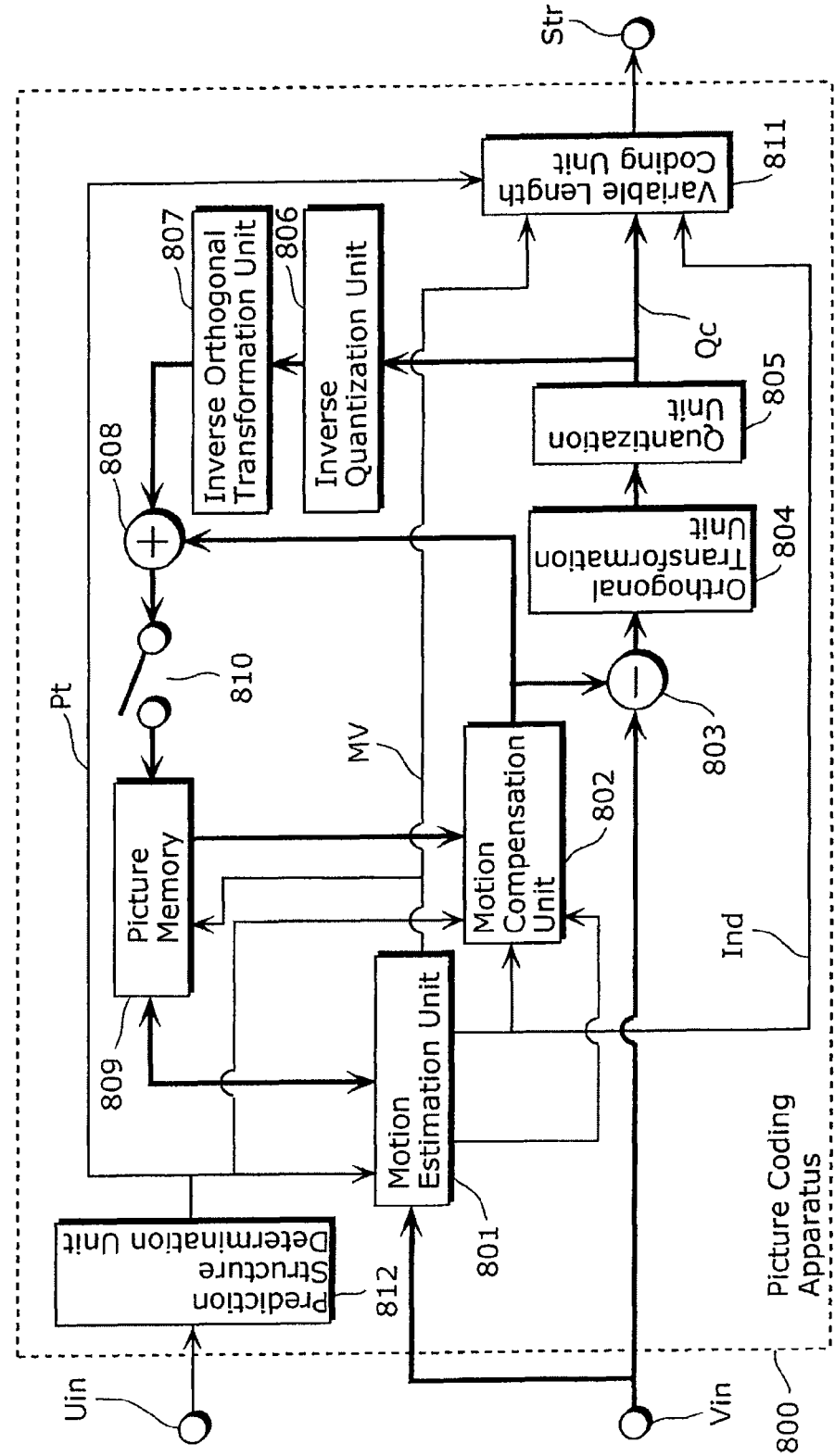
FIG. 4 is a block diagram showing a structure of the conventional picture coding apparatus.
Figure 5:
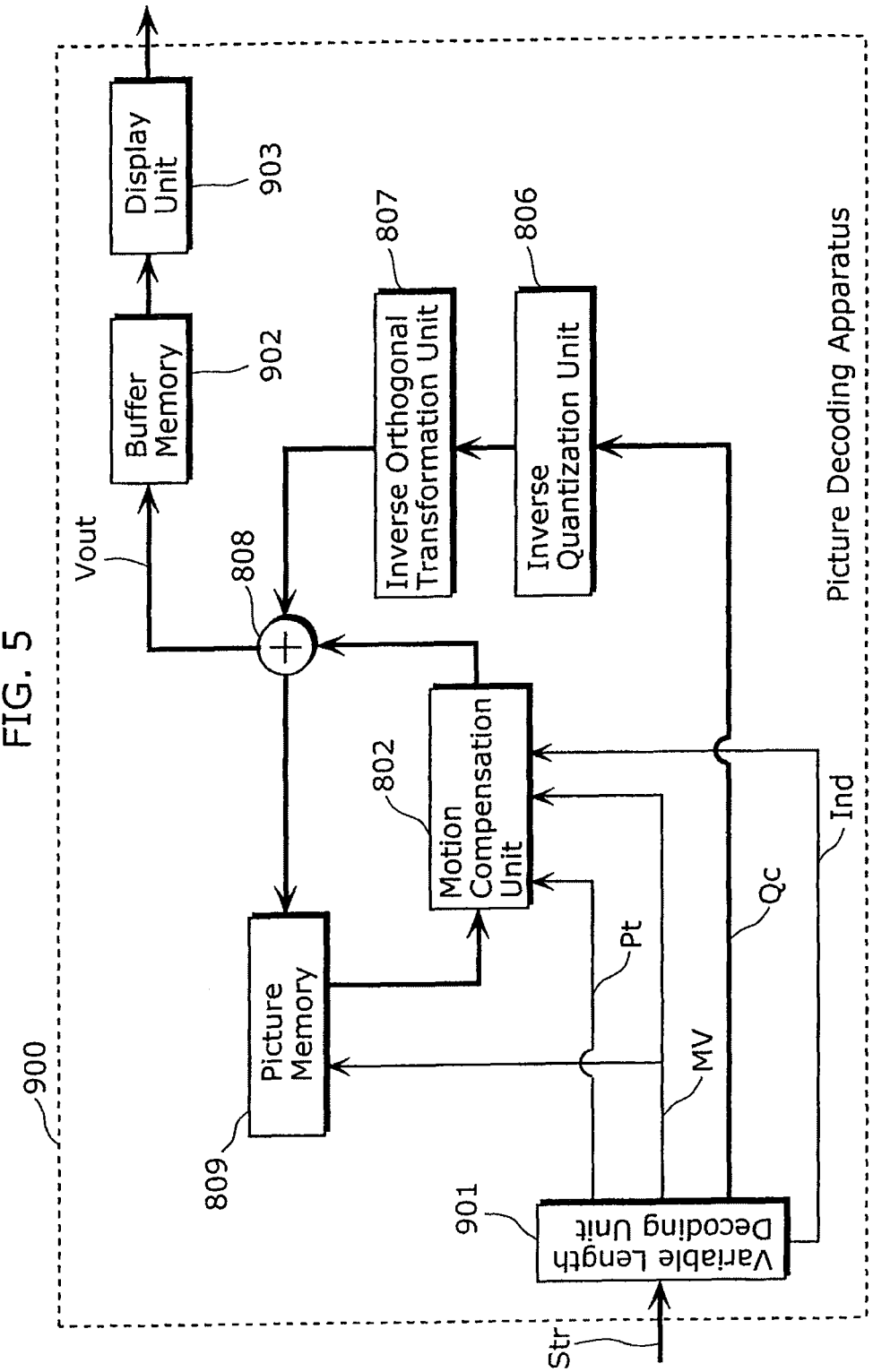
FIG. 5 is a block diagram showing a structure of the conventional picture decoding apparatus.
Figure 6:
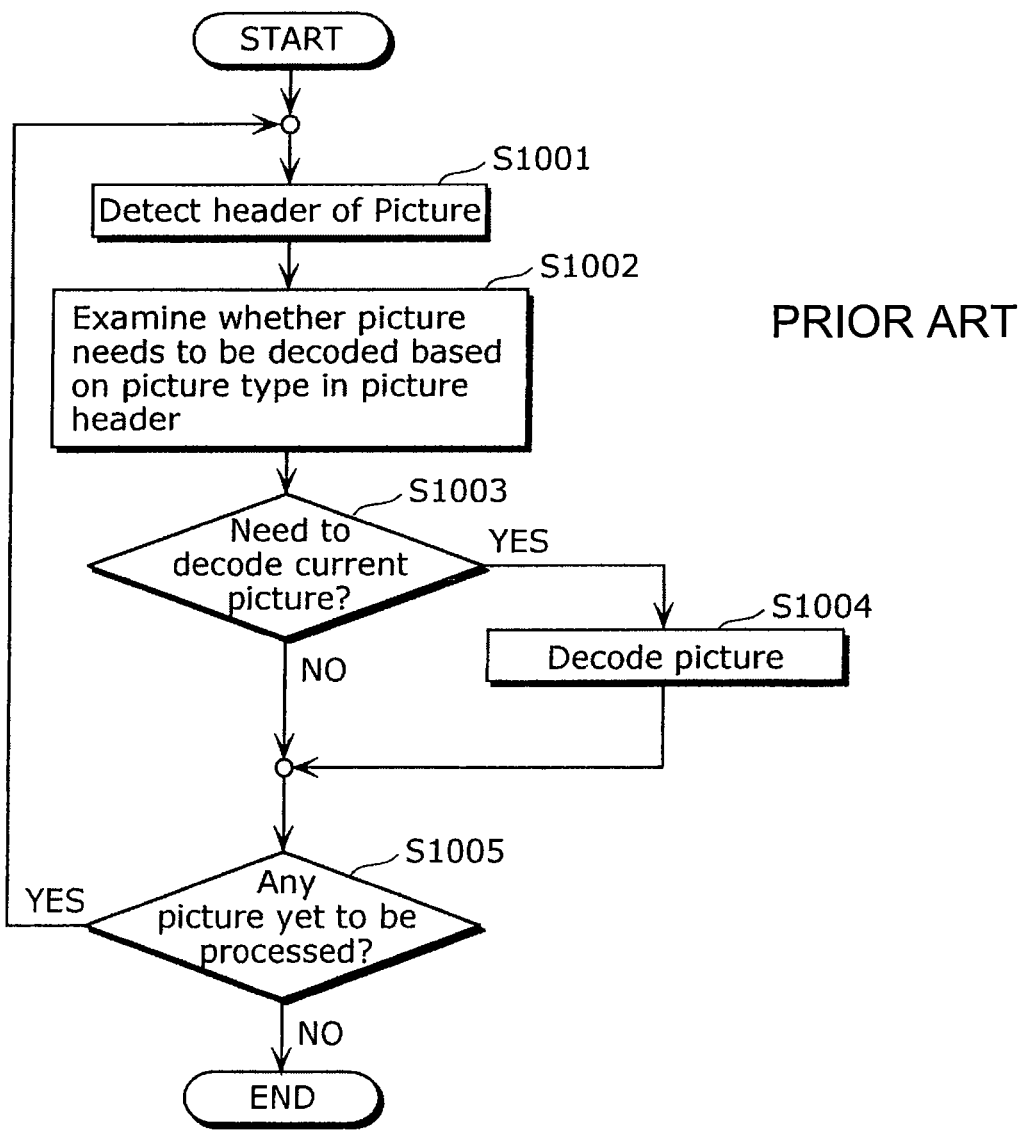
FIG. 6 is a flowchart showing operations which are performed by the conventional picture coding apparatus.
Figure 7:
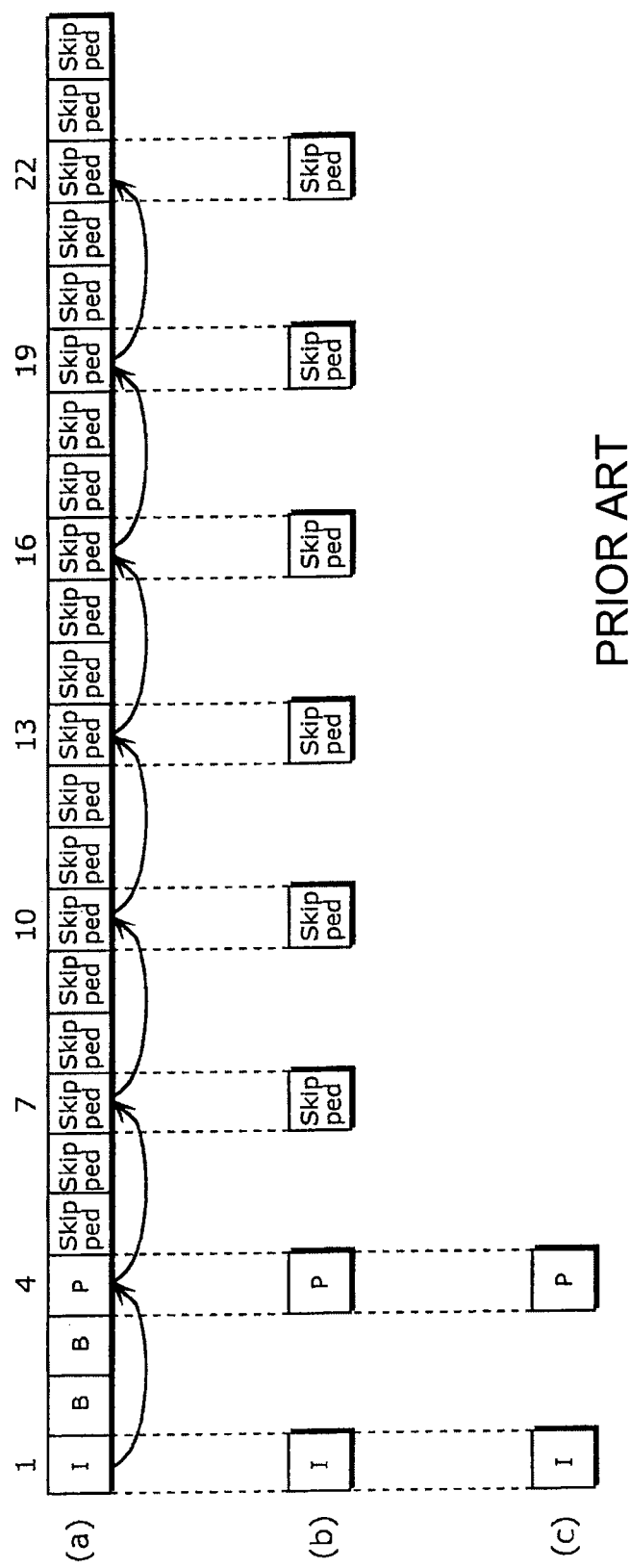
FIG. 7 is a diagram showing a problem in a stream which is generated by the conventional picture coding apparatus, during high-speed play-back.
Figure 8:
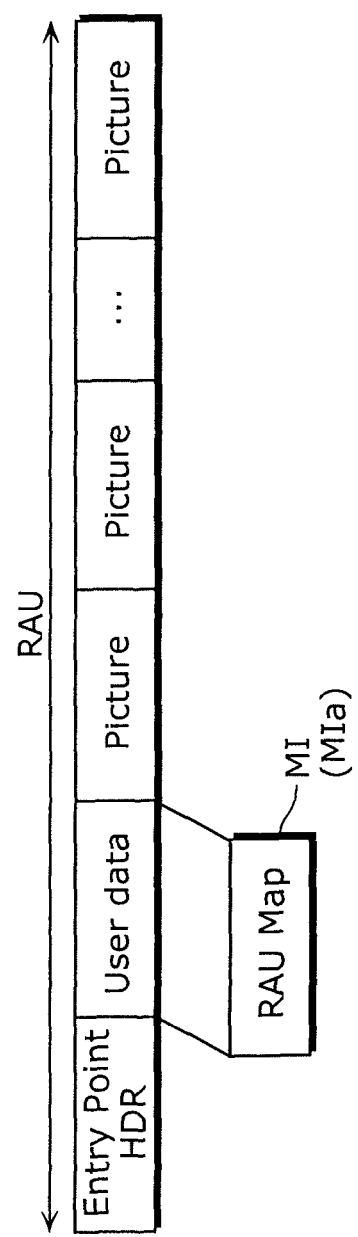
FIG. 8 is a diagram showing an example of a structure of a RAU which is included in a VC-1 stream according to the first embodiment of the present invention.

FIG. 8 is a diagram showing an example of a structure of the RAU which is included in the VC-1 stream according to the first embodiment.

The RAU structure includes an entry point header (Entry Point HDR) and user data which are positioned at the beginning of the RAU, and a plurality of pictures which follow the user data. Note that, in the VC-1 standard, the RAU is referred to as an entry point segment (EPS).

More specifically, the RAU according to the first embodiment differs from the conventional RAU in that the RAU includes a RAU map MI which is arranged in the user data (user data at Entry-point level) and indicates if Skipped-pictures are present in the RAU, also specifies a still picture sequence in the RAU.

Therefore, the picture decoding apparatus according to the first embodiment can examine, by referring to the RAU map MI, whether or not the RAU includes any Skipped-pictures and can specify the still picture sequence, so that it is possible to specify, without analyzing each picture layer in the RAU, pictures which do not need to be decoded, which results in reducing an amount of data to be decoded.

FIG. 9A is a diagram showing an example of a syntax of the RAU map MI.

num_pic_in_RAU represents the number of pictures in the RAU. frame_field_flag represents whether each picture in the RAU is coded in a field structure or in a frame structure. pic_type represents a picture type (including a Skipped-picture type) of each picture. Note that the information regarding each picture is indicated in decoding order. This means that the RAU map MI specifies a still picture sequence in the RAU, by indicating the picture types (including a Skipped-picture type) of the pictures in each RAU. Here, the still picture sequence in the first embodiment means a position and a range from a reference picture to a last Skipped-picture, in a case where a sequence of a plurality of Skipped-pictures follows the reference picture (I-picture or P-picture) in decoding order.

For example, the RAU map MI indicates that pictures from the second picture to a last picture in the RAU are all Skipped-pictures. In the above case, by referring to pic_type in the RAU map MI, the picture decoding apparatus determines to decode the starting picture and display the result repeatedly, without decoding the second and following pictures.

Note that the RAU map MI can include further information on 3:2 pulldown which indicates how many fields one frame is equivalent to in being displayed, or whether decoding of the frame starts from a top field or a bottom field, and the like, for each picture.

FIG. 9B is a diagram showing another example of the syntax of the RAU map MI.

In the advanced profile in the VC-1 standard, picture types of the first field and the second field for a frame of field-structure are indicated by a field-picture type which is included in the picture layer. The field-picture type (picture types of the first picture and the second picture) is defined by eight patterns which are (I, I), (I, P), (P, I), (P, P), (B, B), (B, BI), (BI, B), and (BI, BI). Therefore, in a case where a picture consists of fields, it is possible to indicate picture types of both of the first field and the second field which are included in a frame, by indicating the field-picture type.

Therefore, the syntax of the RAU map MI shown in FIG. 9B also indicates a field-picture type of a picture, in a case where the picture consists of fields. More specifically, num_frame_in_RAU represents the number of the frames in the RAU. field_coding_flag represents whether or not the picture consists of fields. In a case where the picture consists of fields, a field-picture type of the picture is represented by field_type_flag, and in a case where the picture does not consists of fields, a picture type of the picture is represented by picture_type.

That is, the RAU map MI, in the same manner as the RAU map MI shown in FIG. 9A, specifies a still picture sequence in a RAU, by indicating picture types of every pictures in each RAU.

Moreover, in a case where the RAU includes only I-pictures and Skipped-pictures, or only I-pictures, P-pictures, and Skipped-pictures, a part or all parts of the RAU becomes a still picture sequence. In this case, depending on whether a processed part is the still picture sequence or a normal moving-picture sequence, the picture coding apparatus changes the decoding and displaying processing, so that the RAU map MI may include further information regarding whether or not the RAU includes any still picture sequence.

FIG. 9C is a diagram showing still another example of the syntax of the RAU map MI.

In this syntax, motionless_flag represents whether or not the RAU includes any still picture sequence, and start_pic_num and end_pic_num specify the still picture sequence in the RAU. More specifically, in a case where motionless_flag is 1, the RAU map MI indicates that the RAU includes a sill picture sequence. Further, in a case where motionless_flag is 1, the RAU map MI indicates that the still picture sequence starts with an I-picture or P-picture which is represented by start_pic_num, and ends with a Skipped-picture which is represented by end_pic_num.

Note that it is possible to set motionless_flag to as 1, only in a case where all parts of the RAU are a still picture sequence or where the RAU includes a still picture sequence which continues longer than a certain time period.

FIG. 9D is a diagram showing other example of the syntax of the RAU map MI.

In this syntax, number_of_pictures_in_EPS represents the number of pictures included in the EPS. picture_structure represents whether a picture is a field or a frame, or represents how many fields one frame is equivalent to in being displayed. picture_type represents which picture type, namely I-picture, P-picture, B-picture, Skipped-picture, or the like, the picture belongs to. Further, stuffing_bits is used to align all bits of stuffing_bits, picture_structure, and picture_type, by integral multiplication of eight bits. Furthermore, in this syntax, stuffing_bits, picture_structure, and picture_type are indicated in decoding order, regarding respective pictures included in the EPS.

Such RAU map MI, in the same manner as the RAU map MI shown in FIG. 9A, specifies a still picture sequence in pictures in a RAU, by indicating picture types of the pictures in each RAU (EPS).

Note that, the RAU map MI may store the information regarding respective pictures in an order of displaying the pictures. Note also that the RAU map MI may store further information which indicates whether the information regarding respective pictures are stored in the decoding order or in the display order.

Note also that the RAU map MI may be stored in user data in a layer that is different from an entry point layer, for example, in user data for a starting picture. Note also that, in a case where the RAU does not include any Skipped-pictures, the RAU map MI does not need to be generated. In such a case, it is possible to indicate whether or not the RAU includes any Skipped-pictures, by examining the existence of the RAU map MI.

Figure 10:
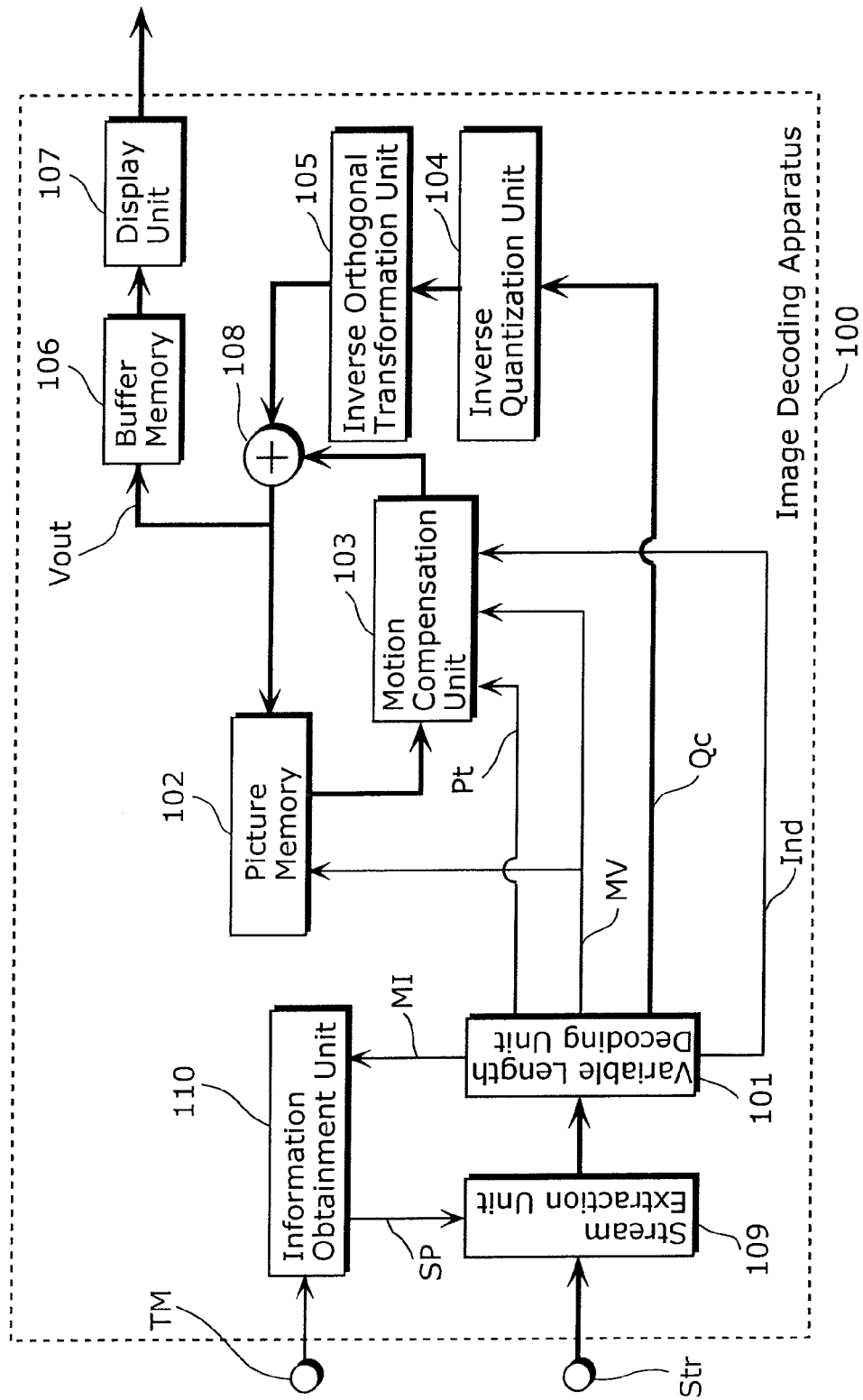
FIG. 10 is a block diagram showing a structure of the picture decoding apparatus according to the first embodiment of the present invention.

FIG. 10 is a block diagram showing a picture decoding apparatus 100 in the first embodiment.

The picture decoding apparatus 100 of the first embodiment which decodes the stream STR that includes the RAU shown in FIG. 8 includes: the variable length decoding unit 101, the picture memory 102, the motion compensation unit 103, the inverse quantization unit 104, the inverse orthogonal transformation unit 105, the buffer memory 106, the display unit 107, the adder 108, a stream extraction unit 109, and an information obtainment unit 110.

This picture decoding apparatus 100 differs from the conventional picture decoding apparatus 900 in that the stream extraction unit 109 and the information obtainment unit 110 are added.

The information obtainment unit 110 obtains the RAU map MI from the variable length decoding unit 101, and also obtains, from the outside, a play-back mode signal TM for instructing details of special play-back such as high-speed play-back. Then, the information obtainment unit 110 analyzes the RAU map MI based on the play-back mode signal TM, and determines (selects) pictures to be decoded. The information obtainment unit 110 outputs a decoding picture instruction signal SP which indicates the determination results, to the stream extraction unit 109.

For example, in a case where the RAU map MI includes the syntax shown in FIG. 9C, the information obtainment unit 110 determines, based on motionless_flag, whether or not the RAU to be play-backed includes any still picture sequence. Then, if the determination is made that the RAU includes a still picture sequence, the information obtainment unit 110 specifies the still area, based on start_pic_num and end_pic_num. After specifying the still picture sequence, the information obtainment unit 110 determines, from the pictures to be play-backed which are indicated by the play-back mode signal TM, only pictures which are not included in the still picture sequence, as pictures to be decoded, and the information obtainment unit 110 outputs the determination results to the decoding picture instruction signal SP. However, if the pictures to be play-backed which are indicated by the play-back mode signal TM include a picture in the still picture sequence, the starting picture of the still picture sequence is determined to be the picture to be decoded.

Further, if the RAU map MI includes the syntax shown in FIG. 9D, the information obtainment unit 110 specifies a still picture sequence, based on picture_type which is indicated for each picture in the RAU. Then, the information obtainment unit 110 determines, from the pictures to be play-backed which are indicated by the play-back mode signal TM, only pictures which are not included in the still picture sequence, as pictures to be decoded, and the information obtainment unit 110 outputs the determination results to the decoding picture instruction signal SP. However, as described above, if the pictures to be play-backed which are indicated by the play-back mode signal TM include a picture in the still picture sequence, the starting picture of the still picture sequence is determined to be the picture to be decoded.

After obtaining the stream STR, the stream extraction unit 109 firstly detects, for each RAU, the coded RAU map MI which is positioned at the beginning of the RAU, and outputs the RAU map MI to the variable length decoding unit 101. After obtaining the decoding picture instruction signal SP which is outputted from the information obtainment unit 110 based on the RAU map MI, the stream extraction unit 109 extracts, from the stream STR, data of the pictures to be decoded which are indicated by the decoding picture instruction signal SP, and outputs the data to the variable length decoding unit 101.

When the variable length decoding unit 101 obtains the coded RAU map MI from the stream extraction unit 109, the variable length decoding unit 101 performs variable length decoding on the coded RAU map MI, and outputs the decoded RAU map MI to the information obtainment unit 110. Further, when the variable length decoding unit 101 obtains, from the stream extraction unit 109, the data of the pictures which are included in the stream STR, the variable length decoding unit 101 performs variable length decoding on the data, and outputs a quantization value Qc, a reference picture specification information Ind, a picture type Pt, and a motion vector MV.

The motion compensation unit 103 retrieves an image which is indicated by the motion vector MV, from the decoded picture (reference picture) which is stored in the picture memory 102 and indicated by the reference picture specification information Ind, and outputs the image as a predicted picture to the adder 108.

The inverse quantization unit 104 inversely quantizes the quantization value Qc to be restored as a frequency coefficient, and outputs the frequency coefficient into the inverse orthogonal transformation unit 105. The inverse orthogonal transformation unit 105 performs inverse-frequency transformation on the frequency coefficient to be transformed into a pixel differential, and outputs the pixel differential to the adder 108. The adder 108 adds the pixel differential with the predicted picture which is outputted from the motion compensation unit 103, and generates a decoded picture Vout. Then, the adder 108 stores the decoded picture Vout into the picture memory 102 and the buffer memory 106. The display unit 107 obtains the decoded picture Vout from the buffer memory 106, and displays a picture corresponding to the decoded picture Vout. Note that the picture memory 102 and the buffer memory 106 may share a single memory.

Note also that the stream extraction unit 109 may output data of all pictures which are included in the RAU, into the variable length decoding unit 101. In this case, the variable length decoding unit 101 selects, from all pictures included in the RAU, pictures which need to be decoded, based on the decoding picture instruction signal SP which is outputted from the information obtainment unit 110. Then, the variable length decoding unit 101 performs variable length decoding on data of the selected pictures. Note that the information obtainment unit 110 may specify the picture to be decoded only for special play-back, such as high-speed play-back and inverse play-back. In case of normal play-back, it can be determined to decode all the pictures without analyzing the RAU map.

Figure 11:
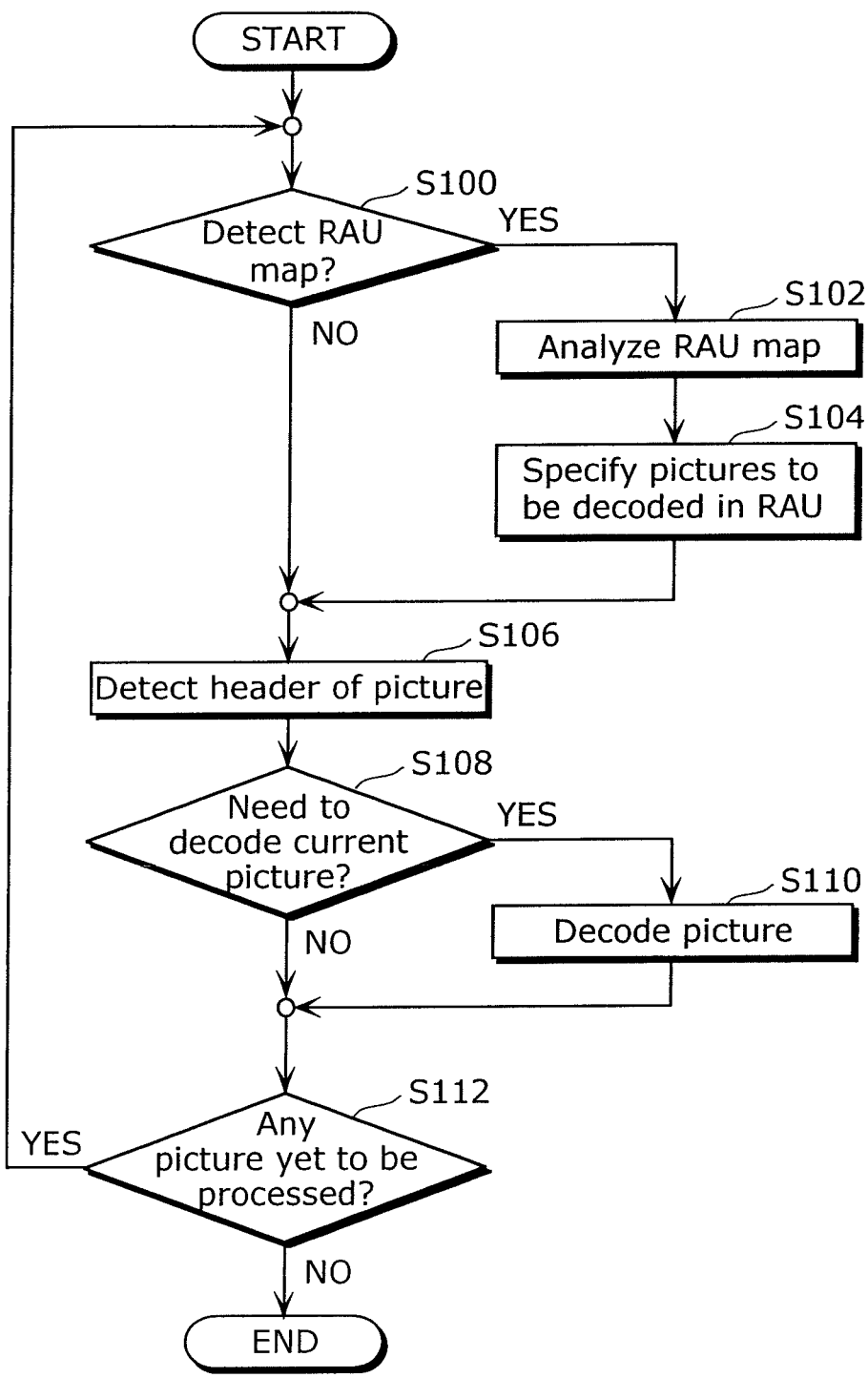
FIG. 11 is a flowchart showing operations which are performed by the picture decoding apparatus according to the first embodiment of the present invention.

FIG. 11 is a flowchart showing operations which are performed by the picture decoding apparatus 100 according to the first embodiment.

When the picture decoding apparatus 100 receives an instruction to start special play-back, the picture decoding apparatus 100 firstly determines whether or not the RAU map MI is stored in user data in an entry point layer (Step S100). In other words, the picture decoding apparatus 100 determines whether or not the RAU map MI is detected. If the picture decoding apparatus 100 detects the RAU map MI (YES at Step S100), then the processing proceeds to Step S102, and if not (NO at Step S100), then the processing skips directly to Step S106.

More specifically, if the picture decoding apparatus 100 detects the RAU map MI (YES at Step S100), the picture decoding apparatus 100 analyzes the RAU map MI (Step S102), and determines (selects), from the pictures in the RAU which are to be play-backed during special play-back, pictures to be decoded, based on result of the analysis (Step S104).

Note that, when the special play-back of the RAU starts, the picture decoding apparatus 100 always detects the RAU map MI at Step S100, and specifies pictures in the RAU to be decoded. In other words, when the special play-back of the RAU starts, the picture decoding apparatus 100 in the first embodiment selects, based on the RAU map MI, from the pictures which are included in the RAU and to be play-backed during the special play-back, pictures except Skipped-pictures, as the pictures to be decoded.

In case the RAU map MI is not detected at Step S100, or after the pictures to be decoded are specified at Step S104, the picture decoding apparatus 100 detects a header of the picture (start code) in the pictures which are in the RAU and to be play-backed during the special play-back (Step S106).

Next, the picture decoding apparatus 100 examines whether or not the picture whose header has been detected at Step 106 and which is a picture to be play-backed during the special play-back among the pictures that have been specified to be decoded at Step S104 (Step S108). Here, if the determination is made that the picture is among the pictures which have been specified to be decoded (YES at Step S108), the picture decoding apparatus 100 decodes the picture (Step S110).

In case determination is made that the picture is not among the pictures which have been specified to be decoded at Step S104 (NO at Step S108), or after the picture is decoded at Step S110, the picture decoding apparatus 100 examines whether or not there are still any pictures to be processed (Step S112).

If no picture to be processed is found (NO at Step S112), then the picture decoding apparatus 100 completes all operations, and if there is still pictures to be processed (YES at Step S112), then the picture decoding apparatus 100 repeats the operations from Step S100. For example, in a case where the RAU map MI has been detected at Step S100 in the previous processing, and the following processing proceeds to Step 100 for the same RAU, the picture decoding apparatus 100 does not need to detect the RAU map MI at S100 (NO at Step S100), but performs the operation at Step S106, namely, detects a header of the next picture to be play-backed during the special play-back.

As described above, the image decoding method in the first embodiment differs from the conventional image decoding method in that the operations from Step S100 to Step S104 are included.

Figure 12:
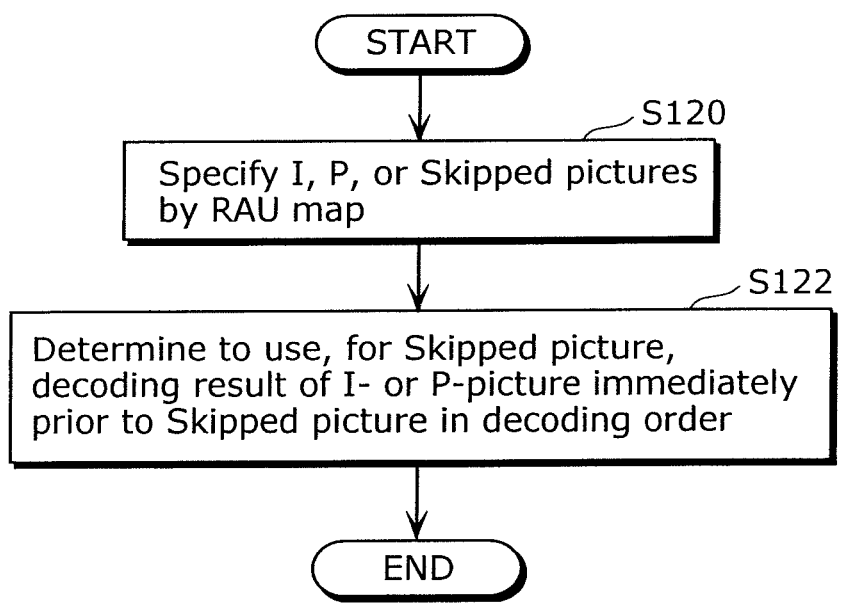
FIG. 12 is a flowchart showing operations of analyzing a RAU map which are performed by the picture decoding apparatus according to the first embodiment of the present invention.

FIG. 12 is a flowchart showing operations of analyzing the RAU map MI which are performed by the picture decoding apparatus 100 according to the first embodiment.

For example, in a case where the RAU map MI includes the syntax shown in FIG. 9D, the picture decoding apparatus 100 firstly analyzes the RAU map MI, and specifies I-pictures, P-pictures, and Skipped-pictures, from the pictures which are included in the RAU and to be play-backed during the special play-back (Step S120).

Next, in a case where the picture to be play-backed during the special play-back is a Skipped-picture, the picture decoding apparatus 100 determines to use a result of decoding an I-picture or a P-picture which is immediately before the Skipped-picture in decoding order, as a picture corresponding to the Skipped-picture (Step S122).

Note that, even in normal play-back which is not the special play-back, it is possible to specify, by referring to the RAU map MI, Skipped-picture and the like, when the play-back of the RAU starts.

When the Skipped-picture included in the RAU is displayed, the picture decoding apparatus 100 displays the result of decoding the I-picture or the P-picture which is specified at Step S122 and is immediately before the Skipped-picture.

Figure 13C:
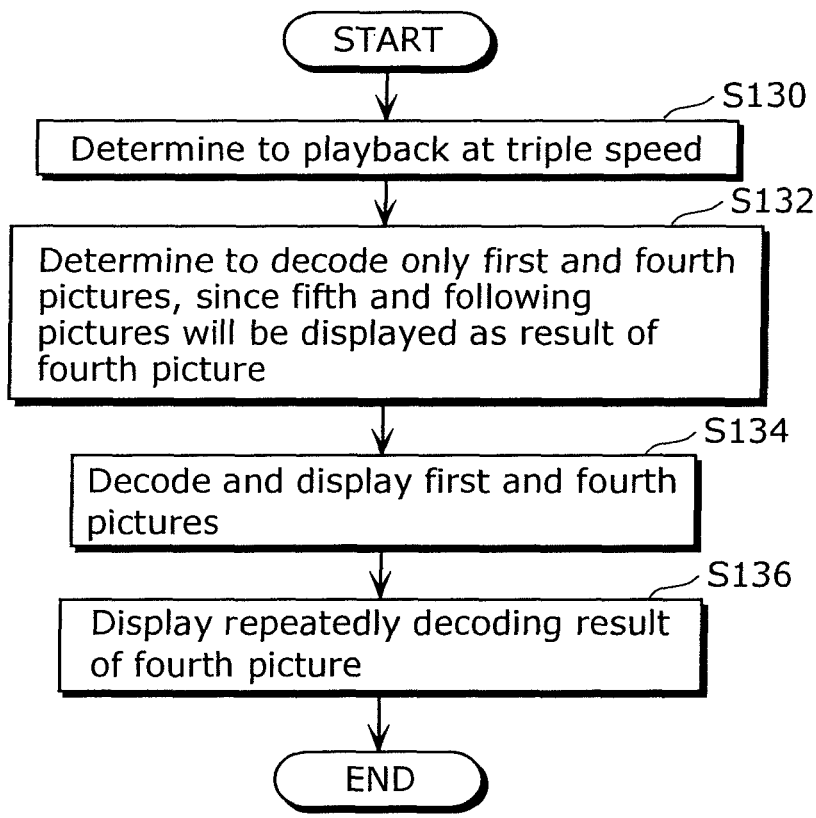
FIG. 13C is a flowchart showing operations of play-backing at a high speed a stream STR having the RAU in FIG. 13A, which is performed by the picture decoding apparatus according to the first embodiment of the present invention.

Here, with reference to FIGS. 13A, 13B, and 13C, operations of high-speed play-back which are performed by the picture decoding apparatus according to the first embodiment.

FIG. 13A is a diagram showing a RAU which is play-backed at a high speed.

The first picture counted from the beginning of the pictures is an I-picture, the second and third pictures are B-pictures, and the fourth picture is a P-picture. The fifth and following pictures are all Skipped-pictures. Note that all of the pictures are frames.

FIG. 13B is a diagram showing a RAU map MI which corresponds to FIG. 13A. The RAU map MI includes the syntax shown in FIG. 9A. Here, all pictures are frames, so that frame_field_flag are set to as 1 for all pictures. Further, pic_type is set to as I-picture, P-picture, B-picture or Skipped-picture, for each picture. Note that, in FIG. 13B, pic_type is set to as "I", "P", "B", or "Skipped", but, in actual practice, pic_type can also be set to as a numeric value which represents the picture type.

FIG. 13C is a flowchart showing operations of high-speed play-back of a stream STR that includes the RAU in FIG. 13A, which is performed by the picture decoding apparatus 100 according to the first embodiment.

Firstly, the picture decoding apparatus 100 determines to play-back at triple speed the RAU in FIG. 13A which is included in the stream STR (Step S130). Note that the play-back at triple speed is a common high-speed play-back, and is the same processing by which only I-pictures and P-pictures are play-backed, in a case where a stream structure of the RAU includes I-picture, B-picture, B-picture, P-picture, B-picture, B-picture, P-picture, B-picture, B-picture, . . . in decoding order.

Next, the picture decoding apparatus 100 determines, based on a result of analyzing the RAU map MI shown in FIG. 13B, that pictures from the fifth picture to the twenty-fourth picture are all Skipped-pictures and that a range from the fourth picture to the twenty-fourth picture is a still picture sequence. Then, the picture decoding apparatus 100 determines to decode only first and fourth pictures, since a result of decoding the fourth picture is used as pictures to be displayed for the fifth and following pictures (Step S132). Subsequently, the picture decoding apparatus 100 decodes and displays the first and fourth pictures (Step S134). Furthermore, the picture decoding apparatus 100 displays the result of decoding the fourth picture repeatedly instead of results of decoding the seventh, tenth, thirteenth, sixteenth, nineteenth, and the twenty-second pictures.

Note that the first embodiment has described that each RAU of the VC-1 stream includes a RAU map and that the picture decoding apparatus 100 decodes the stream, but it is possible to apply any coding method to code the stream, besides the MPEG-4AVC and the MPEG-2 standards, as far as the stream includes the RAU map. Here, even if a coding method in which the same picture type as Skipped-picture is not defined is applied, the method can distinguish a picture from other pictures by regarding the picture as a Skipped-picture in the RAU map, as far as a type of the picture is actually the same as Skipped-picture.

(First Variation)

The following describes the first variation of a play-back method which is performed by the picture decoding apparatus 100 according to the first embodiment.

For example, there would be a case that decoding of the starting picture in the still picture sequence does not complete within a decoding time period which ranges from a decoding time stamp (DTS) to a presentation time stamp (PTS). Therefore, in the variation of the first embodiment, even if the decoding of the starting picture has not completed by the PTS, the starting picture is displayed after the decoding completes.

Figure 14:
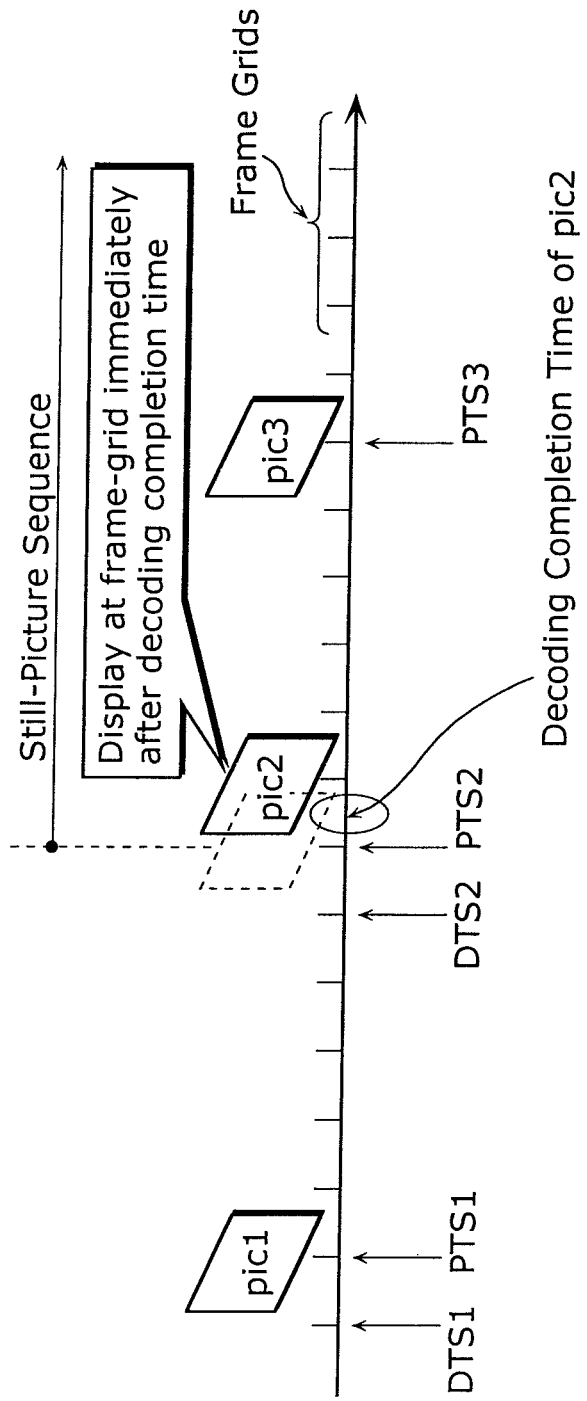
FIG. 14 is an explanatory diagram showing a play-back method which is performed by a picture decoding apparatus according to the first variation of the first embodiment.

FIG. 14 is an explanatory diagram showing the play-back method which is performed by the picture decoding apparatus according to the first variation of the first embodiment.

DTS2 represents a decoding time stamp which is included in a header of a packet (referred to as a PES packet) having a code of a starting picture pic2 in a still picture sequence, in other words, represents a time of decoding the starting picture pic2. PTS2 represents a presentation time stamp which is included in the header of the packet having the code of the starting picture pic2, in other words, represents a time of presentation (output or display) of the starting picture pic2. DTS1, PTS1 and PTS3 represent respective times in the same manner as described above.

For example, the picture decoding apparatus 100, as shown in FIG. 14, starts decoding the starting picture pic2 at DTS2. However, there is a case that a decoding completion time is after the PTS2. Therefore, in a case where a decoding completion time for the starting picture in the still picture sequence is after PTS2, the picture decoding apparatus 100 according to the first variation of the first embodiment starts presentation at a time of a frame-grid which is immediately after the decoding completion time.

Thus, in a case where the decoding starts at a decoding time stamp which is included in the coded starting picture, but the decoding has not completed by a presentation time stamp, the picture decoding apparatus 100 according to the variation of the first embodiment adds a margin to the presentation time stamp and displays the decoded starting picture at such presentation time stamp with the margin.

Figure 15:
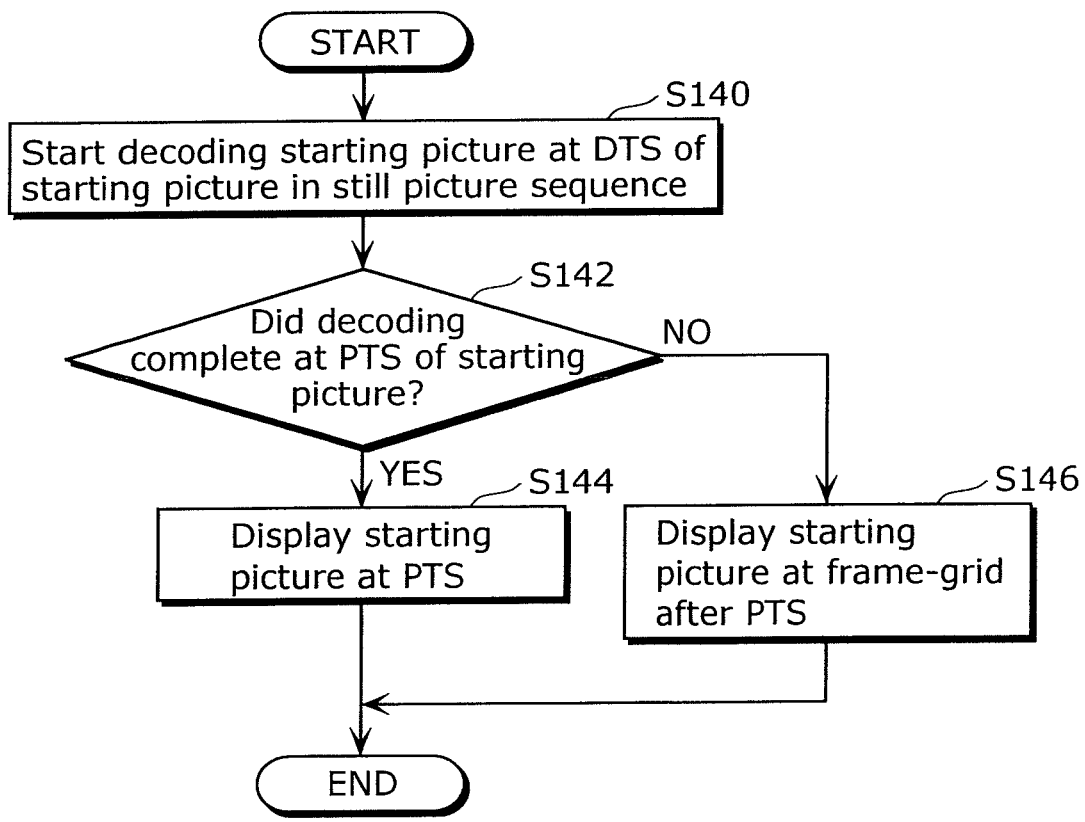
FIG. 15 is a flowchart showing the play-back method which is performed by the picture decoding apparatus according to the first variation of the first embodiment.

FIG. 15 is a flowchart showing the play-back method which is performed by the picture decoding apparatus 100 according to the first variation of the first embodiment.

The picture decoding apparatus 100 according to the first variation of the first embodiment starts decoding a starting picture at a DTS of the starting picture in the still picture sequence (Step S140). Then, the picture decoding apparatus 100 determines whether or not the decoding has completed by a PTS of the starting picture (Step S142). Here, if the determination is made that the decoding has completed (YES at Step S142), then the picture decoding apparatus 100 displays the decoded starting picture, at the PTS (Step S144). On the other hand, if the determination is made that the decoding has not yet completed (NO at Step S142), then the picture decoding apparatus 100 displays the decoded starting picture, at a time after the PTS, namely, at a time of a frame-grid immediately after completing the decoding (Step S146).

Thus, according to the play-back method which is performed by the picture decoding apparatus 100 of the variation of the first embodiment, in a case where the decoding of the starting picture in the still picture sequence is delayed and has not completed by the PTS, a display time of the starting picture is also able to be delayed, so that it is possible to improve picture quality in the sill picture sequence, compared to a case where the starting picture is not displayed.

(Second Variation)

Here, the second variation of the play-back method performed by the picture decoding apparatus 100 according to the first embodiment.

The picture decoding apparatus 100 according to the second variation can reduce the load of the decoding still pictures used in an application such as a Blu-ray Disc (BD).

For a stream, there are two kinds of methods for generating a sequence in which pictures are still. By one method, one or more pictures each of which provides an identical decoded result are positioned consecutively. By the other method, pictures following a starting picture are subsequently positioned in order to improve image quality of the identical picture every decoding processing. To distinguish sequences generated by both of methods, the former is referred to as a complete still picture sequence, and the latter is referred to as a gradually-refreshed still picture sequence.

Here, in the complete still picture sequence, it is possible to start play-back from any desired position in the sequence by decoding a starting picture in the sequence. On the other hand, in the gradually-refreshed still picture sequence, it is impossible to start play-back from any desired position in the sequence by decoding only a starting picture, since the starting picture is decoded to provide a different result from results by decoding other pictures following the starting picture in the sequence. Therefore, when the play-back starts from a picture in the middle of the gradually-refreshed still picture sequence, the picture at the play-back starting position is decoded by sequentially decoding the starting picture and pictures following the starting picture in the sequence. As described above, the complete still picture sequence and the gradually-refreshed still picture sequence need different processing for the special play-back, for example, when jumping play-back is performed, or when the high-speed play-back is changed back to the normal play-back, so that it is necessary to distinguish these sequences.

Thus the RAU map according to the second variation indicates a sequence regarding still pictures in the RAU and also indicates whether the sequence is a complete still picture sequence or a gradually-refreshed still picture sequence. Then the picture decoding apparatus 100 according to the second variation refers to the RAU map thereby easily specifying a picture to be decoded, in order to perform the decoding processing. As a result, it is possible to reduce the decoding processing load.

Figure 16A:
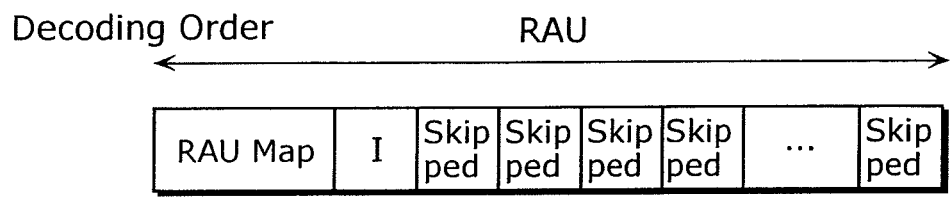
FIG. 16A is a diagram showing a RAU including a complete still picture sequence according to the second variation of the first embodiment.

FIG. 16A is a diagram showing a RAU including the complete still picture sequence.

For example, a RAU map indicates that the RAU has a structure of the complete still picture sequence by indicating a picture type of each picture included in the RAU as shown in FIG. 9D.

Therefore, the picture decoding apparatus 100 by referring to such a RAU map can easily specify, in the complete still picture sequence in the RAU, only a starting I-picture as a picture to be decoded.

Figure 16B:
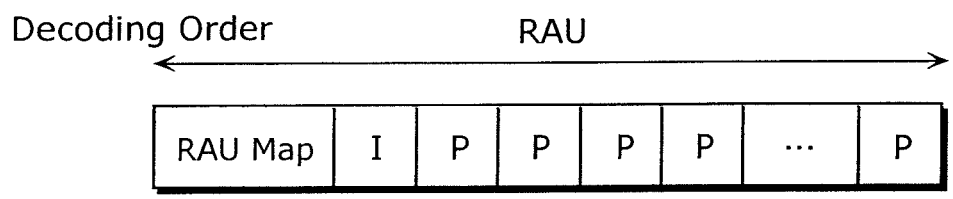
FIG. 16B is a diagram showing a RAU including a gradually-refreshed still picture sequence according to the second variation of the first embodiment.

FIG. 16B is a diagram showing a RAU including a gradually-refreshed still picture sequence.

For example, a RAU map indicates that the RAU has a structure of the gradually-refreshed still picture sequence by indicating a picture type of each picture included in the RAU as shown in FIG. 9D. The gradually-refreshed still picture sequence shown in FIG. 16B has a structure of a I-picture at the beginning of the RAU and a plurality of P-pictures following to the I-picture (following pictures). In such a gradually-refreshed still picture sequence, every time each following P-picture is decoded sequentially, image quality of the picture which is a decoded result of the starting I-picture is improved. This means that such a gradually-refreshed still picture sequence is suitable to improve the image quality of the still pictures up to the last picture in the RAU.

Therefore, when play-back is aimed to start from some P-picture in the gradually-refreshed still picture sequence in the RAU, the picture decoding apparatus 100 can easily specify by referring to such a RAU map, as a picture to be decoded, the starting I-picture in the gradually-refreshed still picture sequence and each P-picture between the I-picture and a P-picture at a play-back starting position.

Figure 16C:
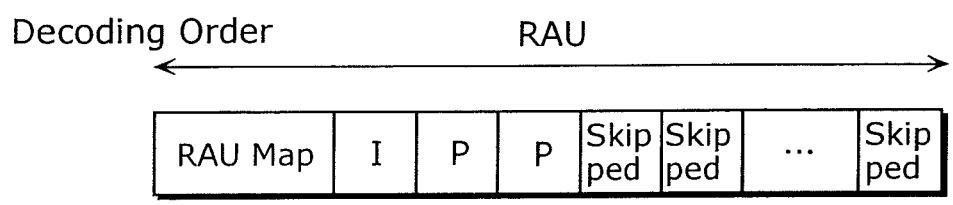
FIG. 16C is a diagram showing a RAU including another gradually-refreshed still picture sequence according to the second variation of the first embodiment.

FIG. 16C is a diagram showing a RAU including another gradually-refreshed still picture sequence.

For example, a RAU map indicates that the RAU has a structure of the gradually-refreshed still picture sequence by indicating a picture type of each picture included in the RAU as shown in FIG. 9D. The gradually-refreshed still picture sequence shown in FIG. 16C has a structure of a I-picture at the beginning of the RAU, two P-picture following the I-picture (following pictures), and a plurality of Skipped-pictures. In such a gradually-refreshed still picture sequence, every time the two P-picture are decoded sequentially, image quality of the picture which is a decoded result of the starting I-picture is improved, and then the image quality is maintained by the Skipped pictures.

Therefore, when play-back is aimed to start from some P-picture in the gradually-refreshed still picture sequence in the RAU, the picture decoding apparatus 100 can easily specify by referring to such a RAU map, as pictures to be decoded, the starting I-picture in the gradually-refreshed still picture sequence and each P-picture between the I-picture and a P-picture from which the play-back to be started. Furthermore, when play-back is aimed to start from some Skipped-picture in the gradually-refreshed still picture sequence in the RAU, the picture decoding apparatus 100 can easily specify by referring to such a RAU map, as pictures to be decoded, the starting I-picture and the two P-pictures in the gradually-refreshed still picture sequence.

Note that the second variation has described that the above RAU map is positioned in a stream, for example, at a beginning of the RAU, but the RAU map may be stored in a time map of management information or the like.

Note also that the second variation has described that when play-back is aimed to start from some picture in the middle of the gradually-refreshed still picture sequence, the starting I-picture and each P-picture between the I-picture and a P-picture at a play-back starting position are specified as pictures to be decoded, but it is not necessary to specify all pictures as pictures to be decoded. More especially, it is possible to specify, as pictures to be decoded, only the starting I-picture or only the starting I-picture and the predetermined number of P-pictures. In this case, although original image quality of a picture at a play-back starting position cannot be achieved, it is possible to reduce processing load in the play-back.

Second Embodiment

Figure 17:
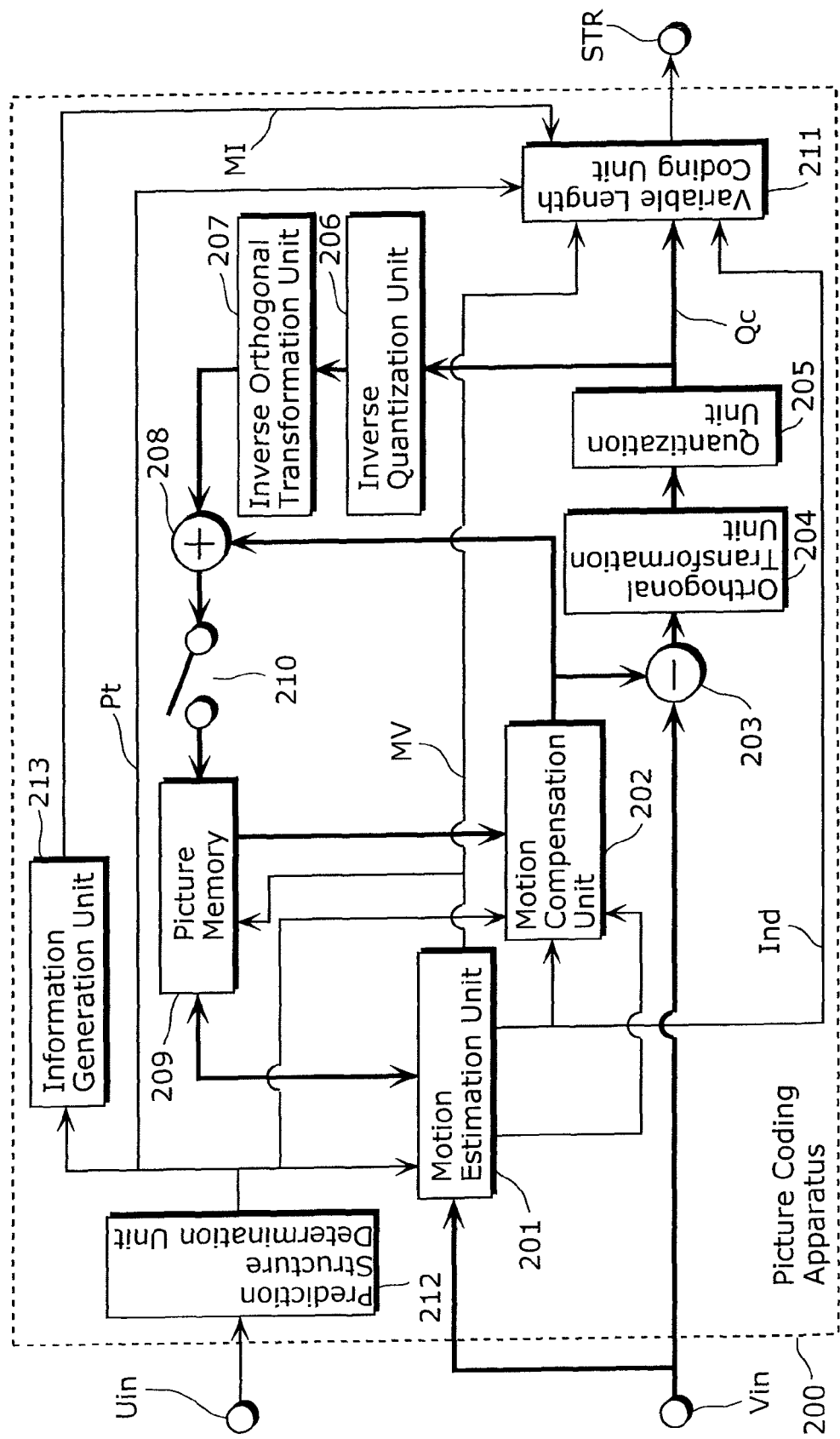
FIG. 17 is a block diagram showing a structure of a picture coding apparatus according to the second embodiment of the present invention.

FIG. 17 is a block diagram showing a picture coding apparatus according to the second embodiment of the present invention.

The picture coding apparatus 200 according to the second embodiment includes: a motion estimation unit 201, a motion compensation unit 202, a subtractor 203, an orthogonal transformation unit 204, a quantization unit 205, an inverse quantization unit 206, an inverse orthogonal transformation unit 207, an adder 208, a picture memory 209, a switch 210, a variable length coding unit 211, a prediction structure determination unit 212, and an information generation unit 213.

The motion estimation unit 201 obtains an image signal Vin in units of macroblocks. Then, the motion estimation unit 201 searches decoded pictures (reference pictures) which are stored in the picture memory 209, and detects an image having the most similar image to a macroblock indicated by the picture signal Vin. The motion estimation unit 201 determines a motion vector MV which indicates a location of the image and outputs the vector MV. The motion estimation unit 201 outputs a reference picture specification information Ind which indicates a decoded picture that has been used to detect the motion vector MV.

The motion compensation unit 202 retrieves the image which is indicated by the motion vector MV, from the decoded pictures which are stored in the picture memory 209 and indicated by the reference picture specification information Ind, and outputs the image as a predicted picture.

The picture prediction structure determination unit 212 determines, based on a RAU start picture Uin, that a picture to be coded is at a RAU start position, then instructs, using a picture type Pt, the motion estimation unit 801 and the motion compensation unit 802 to code (inter-picture coding) the picture as a randomly-accessible picture, and further instructs the variable length coding unit 811 to code the picture type Pt. More specifically, the prediction structure determination unit 212 specifies a picture type, for example, I-picture, P-picture, B-picture, Skipped-picture, or the like, for each picture to be coded which is included in the picture signal Vin.

The subtractor 203 obtains the picture signal Vin and the predicted picture, then calculates a differential between the picture signal Vin and the predicted picture, and outputs the differential to the orthogonal transformation unit 204. The orthogonal transformation unit 204 transforms the differential into a frequency coefficient, and outputs the frequency coefficient into the quantization unit 205. The quantization unit 205 quantizes the frequency coefficient which is inputted from the orthogonal transformation unit 204, and outputs the resulting quantization value Qc into the variable length coding unit 211.

The inverse quantization unit 206 inversely quantizes the quantization value Qc in order to restore the original frequency coefficient, and outputs the resulting frequency coefficient to the inverse orthogonal transformation unit 207. The inverse orthogonal transformation unit 207 performs inverse-frequency transformation on the frequency coefficient to be transformed into a pixel differential, and outputs the pixel differential to the adder 208. The adder 808 adds the pixel differential with the predicted picture which is outputted from the motion compensation unit 202, and generates a decoded picture. The switch 210 is On when the decoded picture is instructed to be stored, and the decoded picture is stored into the picture memory 209.

The information generation unit 213 generates a RAU map MI as shown in one of FIGS. 9A to 9D, according to the picture type Pt determined by the prediction structure determination unit 212, and outputs the generated RAU map MI to the variable length coding unit 211.

The variable length coding unit 211 performs variable length coding on the quantization value Qc, the picture type Pt, the RAU map MI, the motion vector MV, and the like, in order to generate a stream STR.

As described above, the picture coding apparatus 200 according to the second embodiment differs from the conventional picture coding apparatus 800 in that the information generation unit 213 is included.

Figure 18:
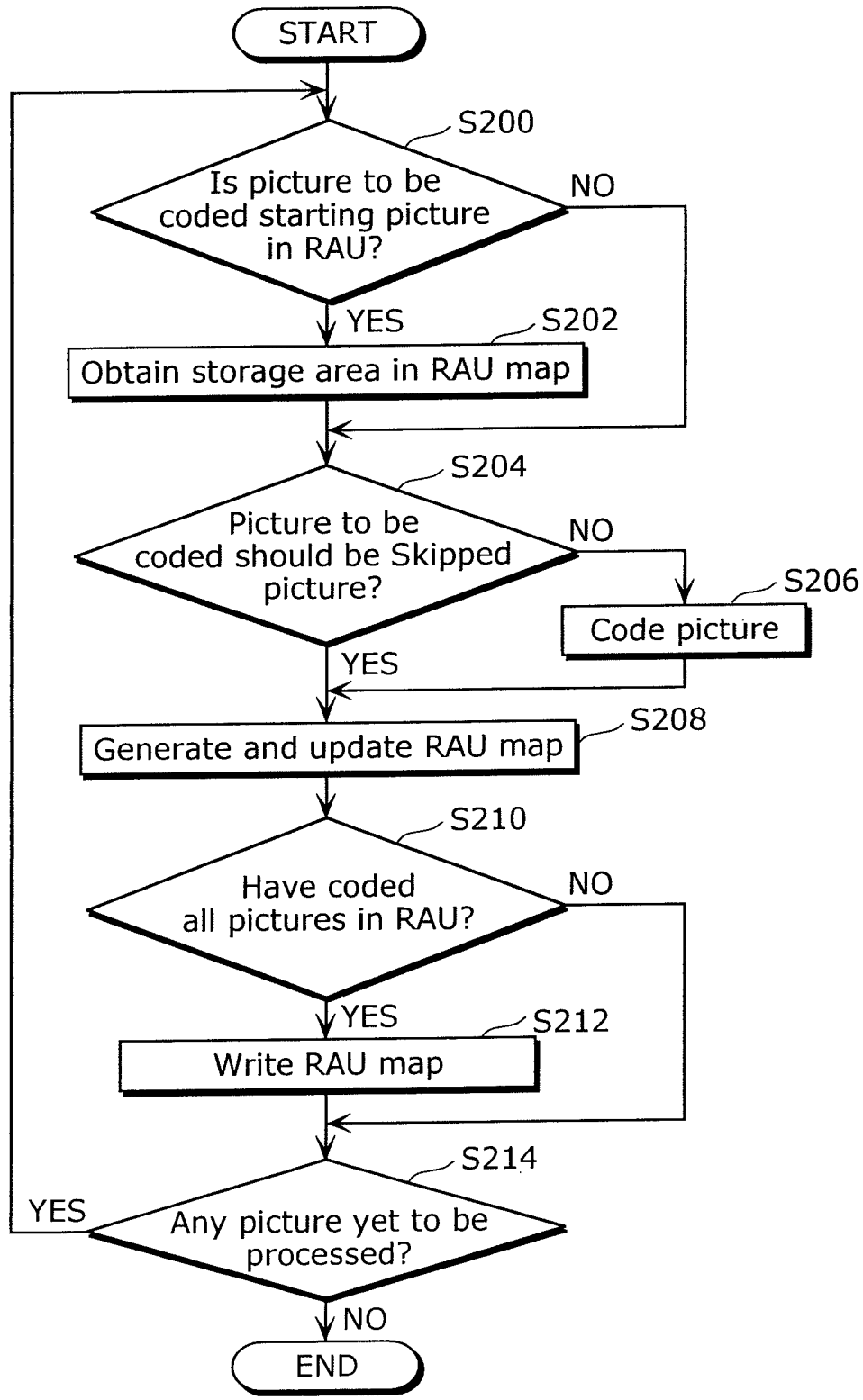
FIG. 18 is a flowchart showing operations which are performed by the picture coding apparatus according to the second embodiment of the present invention.

FIG. 18 is a flowchart showing operations which are performed by the picture coding apparatus 200 according to the second embodiment.

Firstly, the picture coding apparatus 200 determines, by using the prediction structure determination unit 212, whether or not a picture to be coded is a starting picture in a RAU (Step S200). Here, if the determination is made that the picture is the starting picture in the RAU (YES at Step S200), the picture coding apparatus 200 performs, by using the variable length coding unit 211, initialization processing to generate the RAU map MI, and obtains an area for storing the RAU map MI in a user data of an entry point layer (Step S202).

Furthermore, the picture coding apparatus 200 determines, by using the prediction structure determination unit 212, whether or not the picture to be coded as a Skipped-picture (Step S204). Here, if the determination is made that the picture is not a Skipped-picture (NO at Step S204), then the picture coding apparatus 200 codes pixel data of the picture to be coded (Step S206).

Then, the picture coding apparatus 200 generates and updates, by the information generation unit 213, a RAU map MI, based on a result of the determination at Step S204 (Step S208).

For example, the picture coding apparatus 200 generates the RAU map MI as shown in FIG. 9D, in order to include a picture type of the picture which is coded at Step S206, information indicating whether the picture is a field or a frame, and the like. The picture coding apparatus 200 may also generate the RAU map MI as shown in FIG. 9C, in order to include an indication of a still picture sequence.

Next, the picture coding apparatus 200 determines whether or not the picture determined at Step S204 is a last picture in the RAU (Step S210). In other words, the picture coding apparatus 200 determines whether or not the processing has been performed for all pictures which are included in the RAU. Here, if the determination is made that the picture is a last picture (YES at S210), then the picture coding apparatus 200 specifies and codes the RAU map MI, by using the variable length coding unit 211, and writes the RAU map MI into the area which is obtained at Step S202 (Step S212).

Then, the picture coding apparatus 200 determines whether or not there are still pictures to be processed, among pictures included in the stream STR (Step S214). Here, if the determination is made that there is still a picture to be processed (YES at Step S214), then the picture coding apparatus 200 repeats operations from Step S200, and if the determination is made that no picture to be processed is found (NO at Step S214), then the picture coding apparatus 200 completes all coding operations.

Note that, in a case where the information regarding the RAU map MI is not known, or a case where a buffer memory is added in order to buffer data of pictures which are included in the RAU, it is possible to skip Step S202. In this case, the storage area for the RAU map MI is obtained at Step S212, and the RAU map MI is stored in the user data of the entry point layer.

Note also that the picture coding apparatus 200 may generate the stream STR which includes Skipped-pictures, with a fixed bit rate. The amount for coding one Skipped-picture is about 1 byte, and it is necessary to adjust a size of the stream STR by inserting padding data, when coding the picture signal Vin with a fixed bit rate. Here, the padding data may be inserted only in Skipped-pictures. Thereby, it is possible to decode the picture without consuming time for processing the padding data which is inserted in a slice of the data in the picture.

Note also that a sequence layer and the information of the entry point layer need to be read out firstly during the special play-back, so it is desirable to downsize the data as much as possible. Therefore, it can be determined not to insert the padding data between the sequence layer and the entry point layer.

It is also possible to multiplex and record the stream STR which is generated by the coding method according to the second embodiment, together with audio data. Examples of the multiplexing method are a method which is standardized for each packaged media and the like, such as a method using a transport stream packet of the MPEG-2 system or a packet which is defined in Blu-ray Disc (BD).

Moreover, in the simple profile and the main profile, Skipped-picture cannot be identified by the picture type in the picture layer.

Therefore, even if the picture type in the picture layer for each picture is I-picture, P-picture, B-picture, or BI-picture, the picture coding apparatus 200 according to the second embodiment may examine, based on a size of the picture, whether or not the picture is a Skipped-picture, and if the picture is a Skipped-picture, then the RAU map MI may be generated to indicate that the picture is a Skipped-picture. This means that the RAU map MI in the stream STR which is generated by the picture coding apparatus 200 indicates picture types of respective pictures including Skipped-pictures, even in the simple profile and the main profile.

From the same reason, in the main profile, it is also impossible to distinguish a B-picture and a BI-picture by the picture type in the picture layer.

Therefore, the picture coding apparatus 200 according to the second embodiment generates the RAU map MI which indicates picture types of respective pictures which are included in the RAU, based on the picture types Pt which are specified by distinguishing a B-picture and a BI-picture by the prediction structure determination unit 212. This means that the RAU map MI in the stream STR which is generated by the picture coding apparatus 200 can distinguish B-pictures and BI-pictures, even in the main profile. The BI-picture, not like B-picture, can be independently decoded, so that the distinguishing of Bi-picture and B-picture increases flexibility to select pictures to be decoded and play-backed during the special play-back.

In a case a sequence layer is present, it is possible that the RAU include the sequence layer, for example, by always adding the sequence layer to the entry point layer. Further, the user data in the entry point layer may include further information besides the RAU map MI.

In the special play-back, it is important to specify a picture to be decoded and to efficiently access such picture. Therefore, the RAU map MI may indicate address information regarding each picture. Here, the address information may be information regarding a byte position counted from the beginning of the RAU or information to specify a packet in which each picture is stored when the coded data is packetized by a transport stream packet, and the like. Note that the address information may be added, not for all pictures, but only for pictures to be decoded during the special play-back, such as I-pictures or P-pictures.

<Variation>

The following describes a variation of Skipped-picture according to the second embodiment.

In the second embodiment, a Skipped-picture is generated to be a P-picture which has the same pixel data of the reference picture immediately before the Skipped-picture in decoding order. Thereby, the Skipped-picture cannot be used instead of a B picture.

Thus, the variation of the second embodiment generates the Skipped-picture as a B-picture which is not predicted from any other pictures, and as a picture having the same pixel data as a picture that is the reference picture immediately before the Skipped-picture in display order (hereinafter, referred to as a B-skip picture). More specifically, in the variation of the second embodiment, by newly introducing the B-skip picture, it is possible to form a GOP structure, such as I-picture, B-picture, B-picture, P-picture, B-picture, B-picture, P-picture, B-picture, B-picture, . . . , which is commonly used in the MPEG-2 standard, so that IP play-back (special play-back for play-backing only I-pictures and P-pictures) can be easily realized in the picture decoding apparatus.

FIGS. 19A and 19B show examples in which the B-skip pictures are used. Note that, in FIGS. 19A and 19B, "I", "B", "P" and "B-skip" which are included in codes "I2", "B0", "P5" and "B-skip6" and the like, represent picture types of respective pictures, and numerals which are added to the picture types indicate a display order. Note that, in FIG. 19A, the pictures in the RAU are arranged in decoding order, and in FIG. 19B, the pictures in the RAU are arranged in display order. A picture B-skip6 and a picture B-skip7 are predicted from only a picture P5 which is a reference picture immediately before the pictures in display order, and not predicted from a picture P8. The picture coding apparatus 200 according to the variation of the second embodiment generates a stream STR having the RAU shown in FIGS. 19A and 19B.

Here, whether or not a picture is a B-skip picture is indicated by a picture type in the RAU map MI. On the other hand, even if the picture is a B-skip picture, a picture type or a field-picture type which is included in a picture layer of the picture is a B-picture. Therefore, such a stream STR can maintain compatibility with the conventional stream, so that even the conventional decoder which cannot analyze the RAU map MI can treat the B-skip picture as a B-picture, and perform special play-back.

Note that the picture layer may indicate whether or not a picture is a B-skip picture. It is also possible to generate a B-skip picture as a picture which has the same pixel data of a reference picture immediately before the B-skip picture in display order. In such a case, the RAU map MI may indicate whether the B-skip picture is predicted from a reference picture immediately before the B-skip picture or a reference picture immediately after the B-skip picture, in display order.

Third Embodiment

A picture decoding apparatus according to the third embodiment refers to a RAU map indicating BI-pictures, and thereby determines whether or not there are one or more BI-pictures to be positioned in display order immediately before the starting I-picture in an open GOP type RAU. If the determination is made that one or more BI-pictures are to be positioned immediately before the starting I-picture, the picture decoding apparatus starts decoding from the first picture of the BI-pictures.

Here, in the third embodiment, the starting I-picture is a picture positioned in decoding order at the beginning of the RAU and to be positioned in display order as the first I-picture in the RAU. Moreover, the re-ordered picture is a picture positioned in decoding order after the starting I-picture in the RAU but to be positioned in display order before the starting I-picture. Furthermore, the BI-picture is a picture having characteristics of a B-picture and a I-picture (re-ordering of the BI-picture and an I- or P-picture is necessary). More specifically, the BI-picture has the B-picture characteristics in which the BI-picture follows in decoding order a I- or P-picture although the BI-picture precedes in display order the I- or P-picture, and the picture is not a reference picture for other pictures. In addition, the BI-picture has the I-picture characteristics in which all macroblocks are intra-coded and the picture does not refer to any other pictures. Moreover, in an advanced profile and the like, a picture layer of the BI-picture in the stream STR can include picture type information which indicates that a picture of the layer is a BI-picture.

The following describes the third embodiment in more detail.

There are an open GOP type and a closed GOP type in the RAU according to the VC-1 as well as the MPEG-2 standard. The open GOP type RAU is a RAU in which a picture may refer to a picture in another RAU positioned in decoding order immediately before the current RAU. On the other hand, the closed GOP type RAU is a RAU in which a picture refers only a picture in the same RAU. Note that it is possible, by using a flag at an Entry-point level or database for special play-back outside of the stream, to determine whether the RAU is the open GOP type or the closed GOP type.

Here, when jumping play-back is performed from the beginning of the open GOP type RAU, if there is a B-picture positioned in decoding order after a starting picture (I-picture) in the RAU but to be positioned in display order before the starting picture (I-picture), the B-picture is not able to refer to a picture in another RAU immediately before the current RAU, so that it is impossible to decode the B-picture. Therefore, the B-picture is not decoded during the jumping play-back.

On the other hand, even when jumping play-back is performed from the beginning of the open GOP type RAU, if there is a BI-picture positioned in decoding order after the starting picture (I-picture) in the RAU but to be positioned in display order before the starting picture (I-picture), the BI-picture is able to be decoded without referring to any other pictures, so that the play-back can start from the BI-picture.

The following describes in detail an example in which BI-pictures are to be positioned in display order before the starting I-picture in the open GOP type RAU.

Figure 20A:
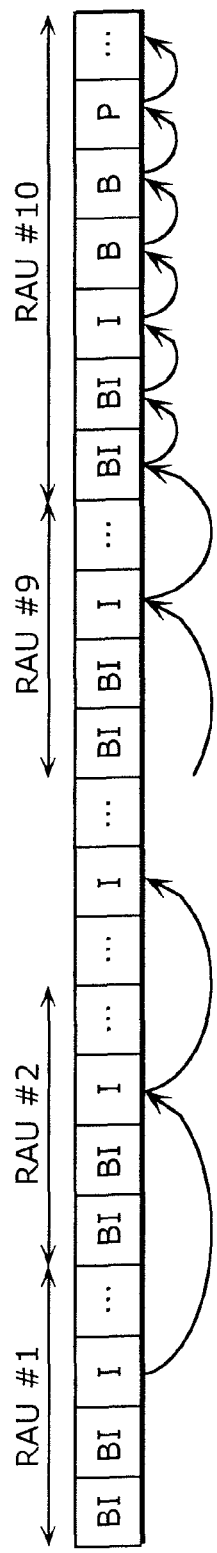
FIG. 20A is an explanatory diagram showing jumping play-back using BI-picture according to the third embodiment of the present invention.

FIG. 20A is an explanatory diagram showing the jumping play-back using BI-picture.

For example, the picture decoding apparatus according to the third embodiment performs high-speed play-back by decoding only the starting I-picture in display order in each RAU and displaying the decoded picture, and then changes the high-speed play-back back to normal play-back, as shown in FIG. 20A. More specifically, the picture decoding apparatus performs the high-speed play-back by decoding only each starting I-picture in the first to ninth RAUs, and changing the high-speed play-back back to the normal play-back from the tenth RAU in FIG. 20A.

Here, even if the tenth RAU is an open GOP type RAU, pictures positioned in the display order before the I-picture that is the first picture in decoding order are BI-pictures, so that the picture decoding apparatus can start the play-back from a starting picture in the tenth RAU (the first BI-picture in display order).

As described above, by setting as BI-pictures, the re-ordered pictures to be displayed before the starting I-picture in the open GOP type RAU, it is possible to realize smooth change from the high-speed play-back to the normal play-back.

Figure 20B:
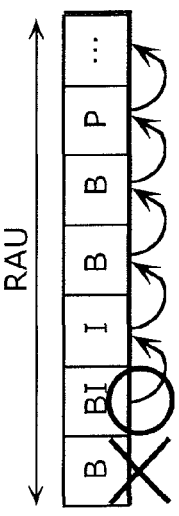
FIG. 20B is an explanatory diagram showing another jumping play-back using BI-picture according to the third embodiment of the present invention.

FIG. 20B is an explanatory diagram showing another jumping play-back using BI-picture.

For example, as shown in FIG. 20B, in a RAU, a B-picture and a BI-picture are sequentially positioned in display order before a starting I-picture.

Here, the B-picture is not able to be decoded during the special play-back (the jumping play-back, for example), since the B-picture refers to a picture in another RAU immediately before the current RAU, so that the picture decoding apparatus can determine that the display should start from the BI-picture.

Figure 20C:
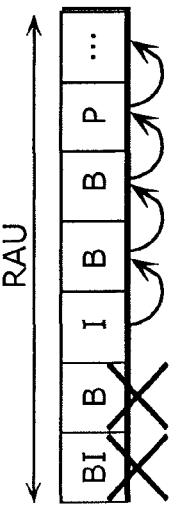
FIG. 20C is an explanatory diagram showing still another jumping play-back using BI-picture according to the third embodiment of the present invention.

FIG. 20C is an explanatory diagram showing still another jumping play-back using BI-picture.

For example, as shown in FIG. 20C, in a RAU, a BI-picture and a B-picture are sequentially positioned in display order before a starting I-picture.

In this case, the BI-picture is surely able to be decoded, but the B-picture following the BI-picture would not be able to be decoded. Therefore, if the RAU has a B-picture that is positioned in display order between a BI-picture as the first picture and a starting I-picture that is the first picture in decoding order, the picture decoding apparatus can determine that the display should start from the I-picture.

The picture decoding apparatus according to the third embodiment refers to a RAU map MIa to smoothly perform the above special play-back. The RAU map MIa is stored in the user data in the RAU as shown in FIG. 8 according to the first embodiment.

Note that syntax of the RAU map MIa according to the third embodiment has the same structure of the syntax according to the first embodiment shown in FIG. 9D. More specifically, the RAU map MIa includes information of number_of_pictures_in_EPS, picture_structure, and picture_type. picture_type indicates to which picture type each picture in decoding order in the RAU belongs: an I-picture, a P-picture, a B-picture, or a BI-picture.

That is, the RAU map MIa according to the third embodiment indicates whether or not there is one or more consecutive BI-pictures positioned in display order immediately before the starting I-picture, by indicating a picture type of each picture in decoding order in the RAU.

Therefore, when jumping play-back is performed from the open GOP type RAU, the picture decoding apparatus according to the third embodiment can easily determine from which picture the play-back should start, by referring to the RAU map MIa stored in the RAU. As a result, the picture decoding apparatus according to the third embodiment can smoothly perform the jumping play-back as shown in FIGS. 20A to 20C.

Note that, in the third embodiment, the RAU map MIa includes picture type information regarding pictures in decoding order as shown in FIG. 9D, but may includes picture type information regarding pictures in display order. Moreover, in the RAU map MIa, the picture type information regarding the pictures or the like can include information indicating in which order the picture type information is stored, namely in decoding order or in display order.

FIG. 21 is a diagram showing another example of syntax of the RAU map MIa according to the third embodiment.

The syntax of this RAU map MIa indicates using independent_decodable_flag whether a BI-picture is positioned in display order immediately before the starting I-picture in the RAU. Furthermore, when independent_decodable_flag is 1, in other words, when the BI-picture is positioned in display order immediately before the starting I-picture, the syntax indicates the number of consecutive BI-pictures positioned immediately before the starting I-picture, using num_decodable_pictures.

When jumping play-back is performed from the open GOP type RAU, the picture decoding apparatus according to the third embodiment refers to the RAU map MIa stored in the RAU. Then the picture decoding apparatus determines whether independent_decodable_flag included in RAU map MIa is 1 or zero. If the determination is made that independent_decodable_flag is 1, then the picture decoding apparatus further specifies the number of pictures indicated by num_decodable_pictures included in the RAU map MIa as the number of the consecutive pictures (consecutive number), and performs play-back from a BI-picture which is positioned in display order by the consecutive number immediately before the starting I-picture. If there is only one BI-picture immediately before the starting I-picture, the picture coding apparatus performs play-back from the BI-picture. On the other hand, if there are a plurality of consecutive BI pictures immediately before the starting I-picture, the picture coding apparatus performs play-back from the first picture of the consecutive BI-pictures.

Note that the RAU map MIa can be stored in user data of a layer different from an entry point layer, for example, in user data of the starting picture in the RAU. Note also that when there is no BI-picture in the RAU, it is not necessary to create the RAU map MIa. In such a case, existence of the RAU map MIa can be used to indicate whether or not the RAU has any BI-pictures immediately before the starting I-picture.

Figure 22:
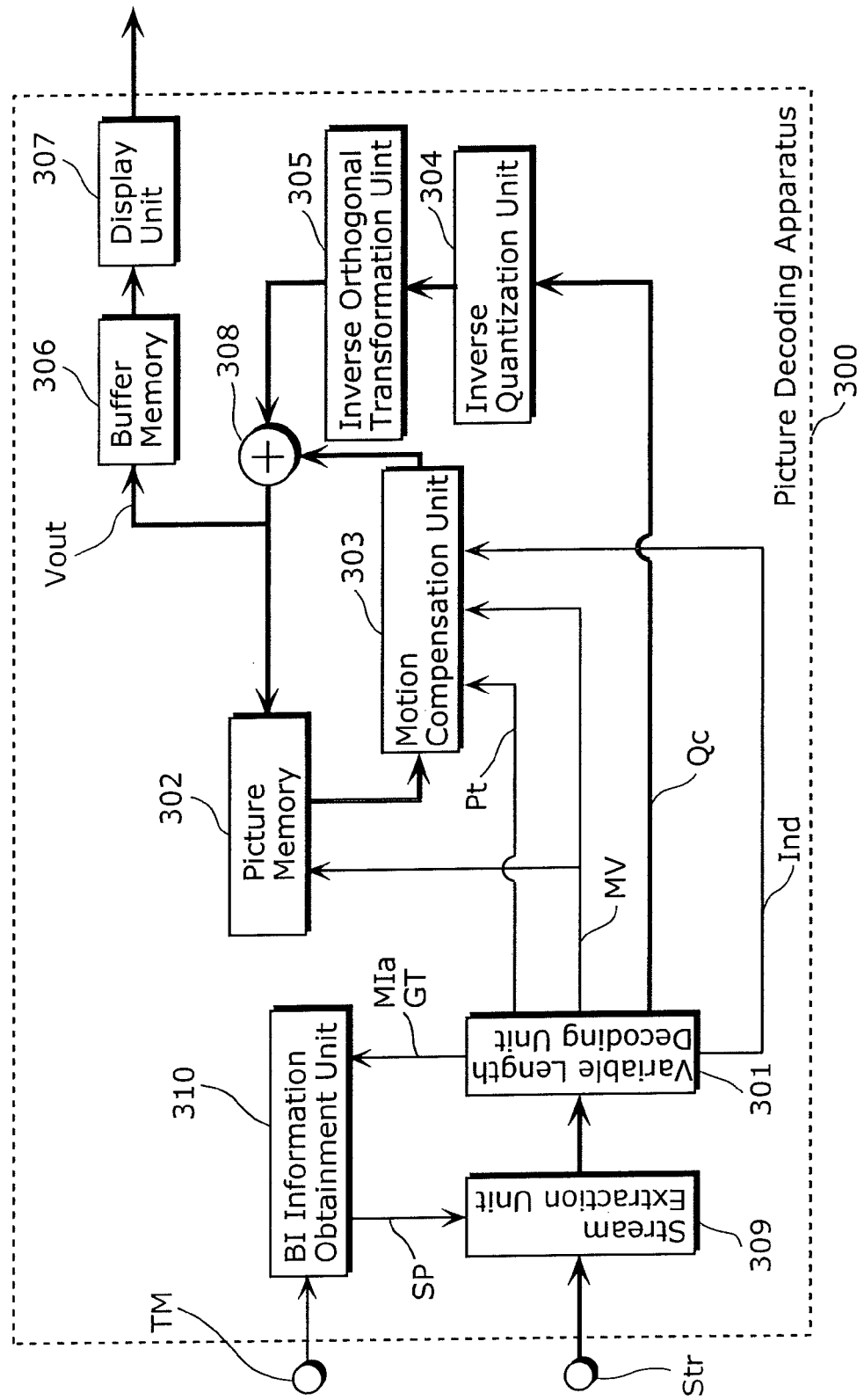
FIG. 22 is a block diagram showing a picture decoding apparatus according to the third embodiment of the present invention.

FIG. 22 is a block diagram showing the picture decoding apparatus 300 according to the third embodiment.

The picture decoding apparatus 300 according to the third embodiment includes a variable length decoding unit 301, a picture memory 302, a motion compensation unit 303, an inverse quantization unit 304, an inverse orthogonal transformation unit 305, and a buffer memory 306, a display unit 307, an adder 308, a stream extraction unit 309, and a BI information obtainment unit 310.

This picture decoding apparatus 300 differs from the conventional picture decoding apparatus 900 in that the stream extraction unit 309 and the BI information obtainment unit 310 are added.

The BI information obtainment unit 310 obtains from the variable length decoding unit 301 group type information GT indicating whether a RAU to be decoded is open GOP type or closed GOP type. If the group type information GT indicates that the RAU is open GOP type, then the BI information obtainment unit 310 further obtains from the variable length decoding unit 301 a RAU map MIa of the RAU to be decoded. Furthermore, the BI information obtainment unit 310 obtains from the outside a play-back mode signal TM for indicating details of the special play-back such as jumping play-back. Then the BI information obtainment unit 310 analyzes the RAU map MIa and the group type information GT based on the play-back mode signal TM, and specifies (selects) a picture to be decoded and displayed.

For example, when the group type information GT of the RAU to be decoded indicates that the RAU is closed GOP type, the BI information obtainment unit 310 specifies, as the pictures to be decoded and displayed, all pictures in the RAU to be decoded.

On the other hand, when the group type information GT of the RAU to be decoded indicates that the RAU is open GOP type, the BI information obtainment unit 310 specifies the pictures to be decoded and displayed based on the RAU map MIa.

For example, when RAU map MIa has the syntax shown in FIG. 21, the BI information obtainment unit 310 determines based on independent_decodable_flag whether or not there are one or more consecutive BI-pictures immediately in display order before the starting I-picture in the RAU to be play-backed. If the determination is made that there is such a BI-picture, then the BI information obtainment unit 310 specifies based on num_decodable_pictures a play-back start position, namely the first BI-picture in display order in the RAU. If the determination is made that there is no such a BI-picture, then the BI information obtainment unit 310 specifies the starting I-picture in the RAU as the play-back start position.

Furthermore, when the RAU map MIa has the syntax shown in FIG. 9D, the BI information obtainment unit 310 determines based on picture_type for each picture in the RAU whether or not there are one or more consecutive BI-pictures positioned in display order immediately before the starting I-picture in the RAU to be play-backed. If the determination is made that there is such a BI-picture, then the BI information obtainment unit 310 specifies as a play-back start position the first BI-picture in display order in the RAU. If the determination is made that there is no such a BI-picture, then the BI information obtainment unit 310 specifies as the play-back start position the starting I-picture in the RAU.

After specifying the play-back start position as described above, the BI information obtainment unit 310 selects, as a picture to be decoded and displayed, pictures existing in display order from the play-back start position, among pictures in the RAU from which the jumping play-back indicated by the play-back mode signal TM is performed.

Then, the BI information obtainment unit 310 outputs a decoding picture instruction signal SP indicating the above results to the stream extraction unit 309.

After obtaining the stream STR, the stream extraction unit 309 firstly detects, for each RAU, a coded entry point header and a RAU map MIa positioned at the beginning of the RAU, and outputs those data to the variable length decoding unit 301. After obtaining the decoding picture instruction signal SP which is outputted from the BI information obtainment unit 310 based on the RAU map MIa, the stream extraction unit 309 extracts, from the stream STR, data of the pictures to be decoded which are indicated by the decoding picture instruction signal SP, and outputs the data to the variable length decoding unit 301.

When the variable length decoding unit 301 obtains the coded entry point header and RAU map MIa from the stream extraction unit 309, the variable length decoding unit 301 performs variable length decoding on the coded entry point header and RAU map MIa. Then the variable length decoding unit 301 outputs the group type information GT stored in the decoded entry point header to the BI information obtainment unit 310. Moreover, the variable length decoding unit 301 outputs the decoded RAU map MIa to the BI information obtainment unit 310 in reply to a request from the BI information obtainment unit 310. Further, when the variable length decoding unit 301 obtains, from the stream extraction unit 309, the data of the pictures which are included in the stream STR, the variable length decoding unit 301 performs variable length decoding on the data, and outputs a quantization value Qc, a reference picture specification information Ind, a picture type Pt, and a motion vector MV.

The motion compensation unit 303 retrieves an image area which is indicated by the motion vector MV, from the decoded picture (reference picture) which is stored in the picture memory 302 and indicated by the reference picture specification information Ind, and outputs the image area as a predicted image to the adder 308.

The inverse quantization unit 304 inversely quantizes the quantization value Qc to be restored as a frequency coefficient, and outputs the frequency coefficient into the inverse orthogonal transformation unit 305. The inverse orthogonal transformation unit 305 performs inverse-frequency transformation on the frequency coefficient to be transformed back to a pixel differential, and outputs the pixel differential to the adder 308. The adder 308 adds the pixel differential with the predicted picture which is outputted from the motion compensation unit 303, and generates a decoded picture Vout. Then, the adder 308 stores the decoded picture Vout into the picture memory 302 and the buffer memory 306. The display unit 307 obtains the decoded picture Vout from the buffer memory 306, and displays a picture corresponding to the decoded picture Vout. Note that the picture memory 302 and the buffer memory 306 may share a single memory.

Note also that the stream extraction unit 309 may output, into the variable length decoding unit 301, data of all pictures included in the RAU, without depending on the play-back mode signal TM, the RAU map MIa, or the group type information GT. In this case, the variable length decoding unit 301 selects, from all pictures included in the RAU, pictures to be decoded and displayed, based on the decoding picture instruction signal SP which is outputted from BI the information obtainment unit 310. Then, the variable length decoding unit 301 performs variable length decoding on data of the selected pictures. Note that the information obtainment unit 310 may specify the picture to be decoded only for the special play-back, such as the jumping play-back, inverse play-back, and the changing back from the high-speed play-back. For the normal play-back, the information obtainment unit 310 may specify all pictures as pictures to be decoded and displayed without analyzing the RAU map MIa and the like. Especially, in case of change from special play-back to normal play-back as described in the third embodiment, it is enough to analyze the RAU map MIa of the first RAU from which normal play-back starts.

Figure 23:
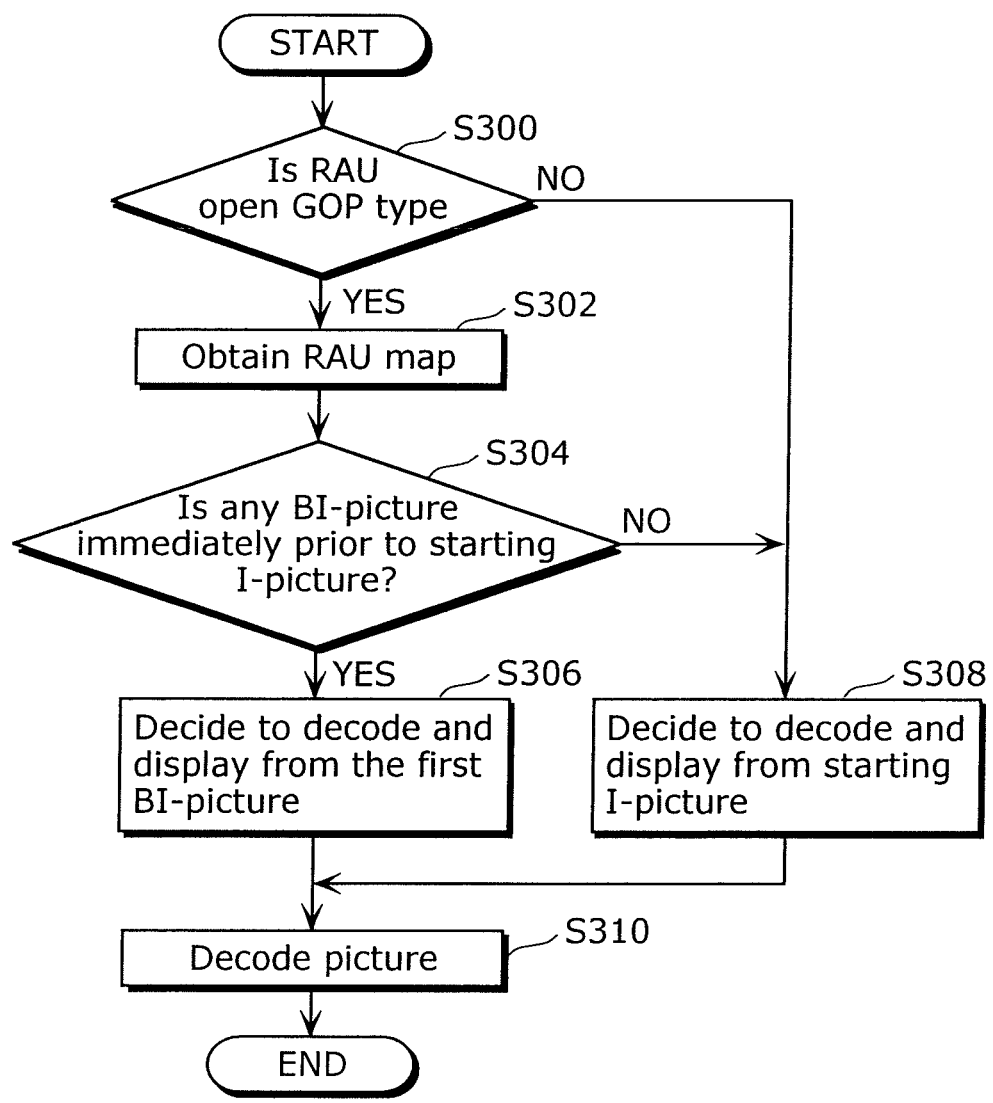
FIG. 23 is a flowchart showing operations which are performed by the picture decoding apparatus 300 according to the third embodiment of the present invention.

FIG. 23 is a flowchart showing operations which are performed by the picture decoding apparatus 300 according to the third embodiment.

Firstly, the picture decoding apparatus 300 determines whether or not a RAU to be decoded is open GOP type or closed GOP type based on the group type information GT stored in the entry point header of the RAU to be decoded (Step S300).

Here, If the determination is made that the RAU is open GOP type (YES at Step S300), then the picture decoding apparatus 300 obtains a RAU map MIa stored in the RAU to be decoded (Step S302).

Then the picture decoding apparatus 300 determines based on the RAU map MIa whether or not there are one or more consecutive BI-pictures to be positioned in display order immediately before a starting I-picture in the RAU to be decoded (Step S304).

If the determination is made that there is such a BI-picture (YES at Step S304), the picture decoding apparatus 300 specifies, as pictures to be decoded and displayed, such consecutive BI-pictures and pictures positioned in display order after the consecutive BI-pictures (Step S306). This means that when there is only a single BI-picture, not a plurality of consecutive BI-pictures, positioned in display order immediately before the starting I-picture, the picture decoding apparatus 300 specifies, as pictures to be decoded, the BI-picture and pictures positioned in display order after the BI-picture.

Moreover, when there are a plurality of consecutive BI-pictures positioned in display order immediately before the starting I-picture, the picture decoding apparatus 300 specifies, as pictures to be decoded, the BI-pictures and pictures positioned in display order after the consecutive BI-pictures.

On the other hand, if the determination is made that there is no such a BI-picture (NO at Step S308), then the picture decoding apparatus 300 specifies, as pictures to be decoded and displayed, the starting I-picture and pictures positioned in display order after the starting I-picture, among the pictures included in the RAU to be decoded.

Moreover, when the determination is made that the RAU to be decoded is closed GOP type at Step S300 (NO at Step S300), the picture decoding apparatus 300 specifies, as pictures to be decoded and displayed, the starting I-picture and pictures positioned in display order after the starting I-picture, among the pictures included in the RAU to be decoded, in the same manner as described above (Step S308). In this case, the picture decoding apparatus 300 determines all pictures included in the RAU to be decoded as the pictures to be decoded and displayed.

Then the picture decoding apparatus 300 decodes the pictures specified at Steps S306 and S308 (Step S310).

Note that the picture to be decoded may be determined always based on the result of analyzing the RAU map by starting the processing from Step S302, without processing Step S300 for determining whether or not the RAU is an open GOP type RAU.

Thus, in the third embodiment, when the special play-back such as the jumping play-back is performed from the RAU, the picture decoding apparatus 300 can easily determine by referring to the RAU map MIa whether or not there is an independent BI-picture positioned in display order immediately before the starting I-picture that is the first picture in decoding order. As a result, when a BI picture is not positioned immediately before the starting picture, the picture decoding apparatus 300 can speedily extract, as pictures to be decode, the starting I-picture and pictures positioned in display order after the starting I-picture, among the pictures included in the RAU. Furthermore, when a-BI picture is positioned immediately before the starting picture, the picture decoding apparatus 300 can speedily extract also the BI-picture as a picture to be decode, among the pictures included in the RAU.

Therefore, the picture decoding apparatus 300 according to the third embodiment does not need to conventionally analyze each picture layer of the pictures included in the RAU nor determine whether a picture is a B-picture or a BI-picture in order to determine pictures to be decoded, so that it is possible to reduce load of the decoding processing. Furthermore, when a BI-picture is positioned in display order immediately before the starting I-picture, the BI-picture is able to be easily decoded and displayed, so that is possible to use the BI-picture effectively.

Note that the third embodiment has described that the RAU map MIa indicates whether or not a picture positioned in display order before the starting picture is a BI-picture, but other method except the RAU map MIa can be used to indicate the same. For example, flag information of an entry point layer, a time map of management information, or user data of a VC-1 stream can be used.

<Variation>

Here, a variation of the picture decoding apparatus 300 according to the third embodiment is described.

The picture decoding apparatus 300 according to the variation can improve function of the special play-back by using BI-picture.

Figure 24:
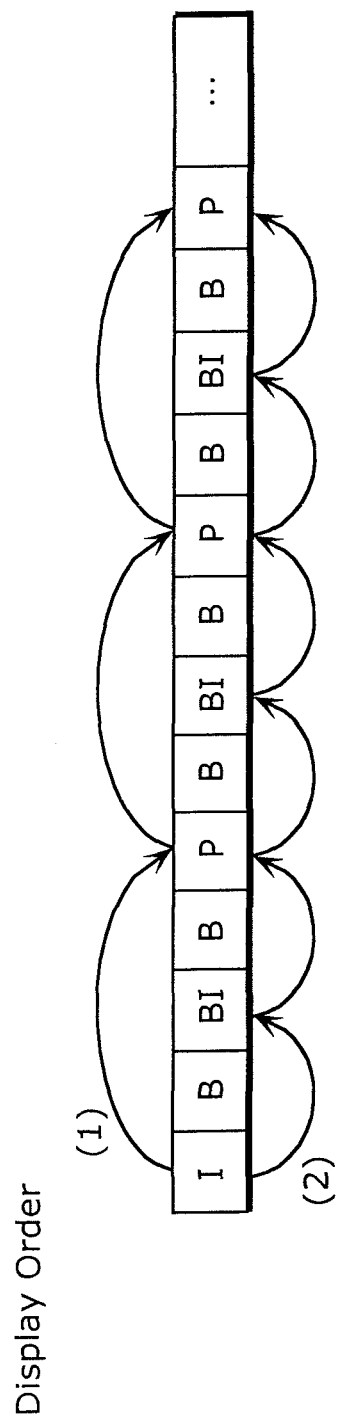
FIG. 24 is an explanatory diagram showing the operations performed by the picture decoding apparatus according to a variation of the third embodiment of the present invention.

FIG. 24 is an explanatory diagram showing operations performed by the picture decoding apparatus 300 according to the variation. For example, as shown in FIG. 24, a stream has two B-pictures and one BI-picture positioned in display order between an I-picture and a P-picture or between two P-pictures.

In the above case, the picture decoding apparatus 300 according to the variation can perform four times speed play-back by decoding only an I-picture and a P-picture as shown in (1) of FIG. 24. Furthermore, the picture decoding apparatus 300 according to the variation can perform double speed play-back by decoding a BI-picture in addition to the I-picture and the P-picture as shown in (2) of FIG. 24.

As described above, the picture decoding apparatus 300 according to the variation can improve the function of the special play-back for the stream, if BI-pictures are positioned with a predetermined cycle.

Moreover, the picture decoding apparatus 300 according to the variation can determine where a BI-picture is positioned in decoding order or in display order in the RAU to be decoded, by referring to the RAU map MIa having the syntax as shown in FIG. 9D, for example. Furthermore, the picture decoding apparatus 300 can determine where an I-picture and a P-picture are positioned. This means that the picture decoding apparatus 300 according to the variation can speedily specify pictures to be decoded and displayed during the special play-back, by referring to the RAU map MIa or the like.

Note that even when there is a B-picture to be displayed before the starting I-picture, if the B-picture does not refer to a picture in another RAU immediately before the current RAU, the RAU map or a flag at an entry point level may indicate that the RAU is a closed GOP type RAU.

Note also that the variation of the third embodiment has described that the RAU map MIa is stored in each RAU of the VC-1 stream and the picture decoding apparatus 300 decodes the stream, but as far as the RAU map MIa is stored in a RAU, the coding method may be other methods except the VC-1, such as the MPEG-4AVC and the MPEG-2. In such a case, a BI-picture of VC-1 corresponds to a B-picture whose macroblocks are all intra-coded.

Fourth Embodiment

Figure 25:
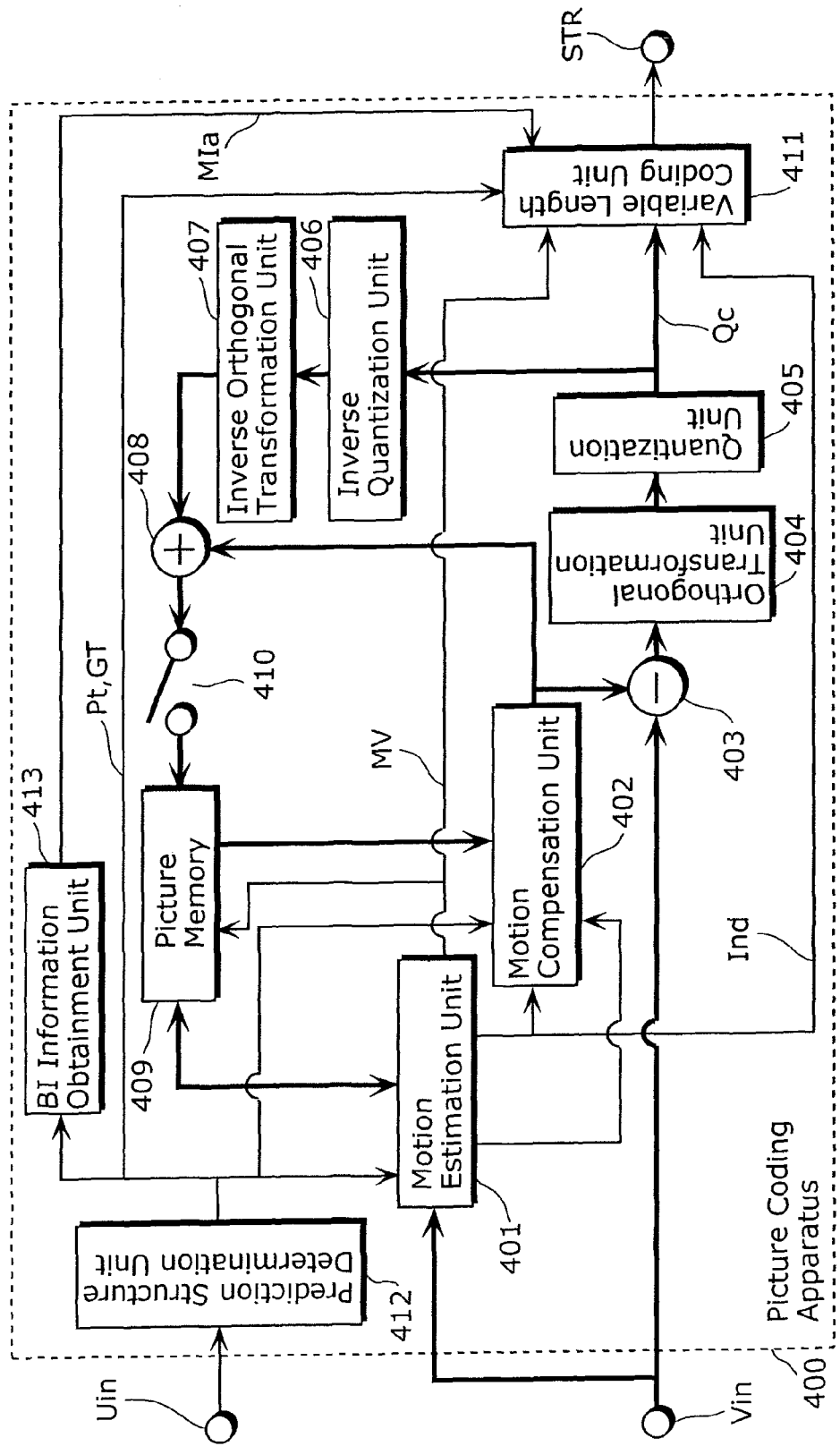
FIG. 25 is a block diagram showing a picture coding apparatus according to the fourth embodiment of the present invention.

FIG. 25 is a block diagram showing a picture coding apparatus according to the fourth embodiment.

The picture coding apparatus 400 according to the fourth embodiment includes a motion estimation unit 401, a motion compensation unit 402, a subtractor 403, an orthogonal transform unit 404, a quantization unit 405, an inverse quantization unit 406, an inverse orthogonal transformation unit 407, an adder 408, a picture memory 409, a switch 410, a variable length coding unit 411, a prediction structure determination unit 412, and a BI information generation unit 413.

The motion estimation unit 401 obtains a picture signal Vin in units of macroblocks. Then the motion estimation unit 401 searches decoded pictures (reference pictures) stored in the picture memory 409 and detects an image area having the most similar image to a macroblock indicated by the picture signal Vin. The motion estimation unit 401 determines a motion vector MV for indicating a location of the image area and outputs the motion vector MV. The motion estimation unit 401 further outputs a reference picture specification information Ind for indicating the decoded picture used to detect the motion vector MV.

The motion compensation unit 402 retrieves the image area indicated by the motion vector MV, from the decoded picture which is stored in the picture memory 409 and is indicated by the reference picture specification information Ind, and then outputs the retrieved picture as a predicted picture.

The prediction structure determination unit 412 determines, based on a RAU start picture Uin, that a picture to be coded exists at a RAU start position, then instructs the motion estimation unit 401 and the motion compensation unit 402 to code (inter-picture coding) the picture as a special randomly-accessible picture, and further instructs the variable length coding unit 411 to code the picture type Pt. More specifically, the prediction structure determination unit 412 determines a picture type Pt, for example an I-picture, a P-picture, a B-picture, or a BI-picture, of each picture to be coded which is included in the picture signal Vin.

Furthermore, the prediction structure determination unit 412 determines group type information GT regarding the RAU to be coded, and makes the variable length coding unit 411 code the group type information GT. The subtractor 403 obtains the picture signal Vin and the predicted picture, then calculates a differential between the picture signal Vin and the predicted picture, and outputs the differential to the orthogonal transformation unit 404. The orthogonal transformation unit 404 transforms the differential into a frequency coefficient, and outputs the frequency coefficient into the quantization unit 405. The quantization unit 405 quantizes the frequency coefficient which is inputted from the orthogonal transformation unit 404, and outputs the resulting quantization value Qc into the variable length coding unit 411.

The inverse quantization unit 406 inversely quantizes the quantization value Qc in order to restore the original frequency coefficient, and outputs the resulting frequency coefficient to the inverse orthogonal transformation unit 407. The inverse orthogonal transformation unit 407 performs inverse-frequency transformation on the frequency coefficient to be transformed back to a pixel differential, and outputs the pixel differential to the adder 408. The adder 408 adds the pixel differential with the predicted picture which is outputted from the motion compensation unit 402, and generates a decoded picture. The switch 410 is On when the decoded picture is instructed to be stored, and the decoded picture is stored into the picture memory 409.

The BI information generation unit 413 generates a RAU map MIa having syntax as shown in FIG. 9D or FIG. 21, according to the picture type Pt determined by the prediction structure determination unit 412, and outputs the generated RAU map MIa to the variable length coding unit 411.

The variable length coding unit 411 performs variable length coding on the quantization value Qc, the picture type Pt, the RAU map MIa, the motion vector MV, and the like, in order to generate a stream STR. More specifically, the variable length coding unit 411 writes the RAU map MIa generated by the BI information generation unit 413 into user data positioned before any pictures as shown in FIG. 8. Furthermore, the variable length coding unit 411 applies the variable length coding on the group type information GP, and adds the coded group type information GP to an entry point header in the RAU.

As described above, the picture coding apparatus 400 according to the fourth embodiment differs from the conventional picture coding apparatus 800 in that the BI information generation unit 413 is added.

Figure 26:
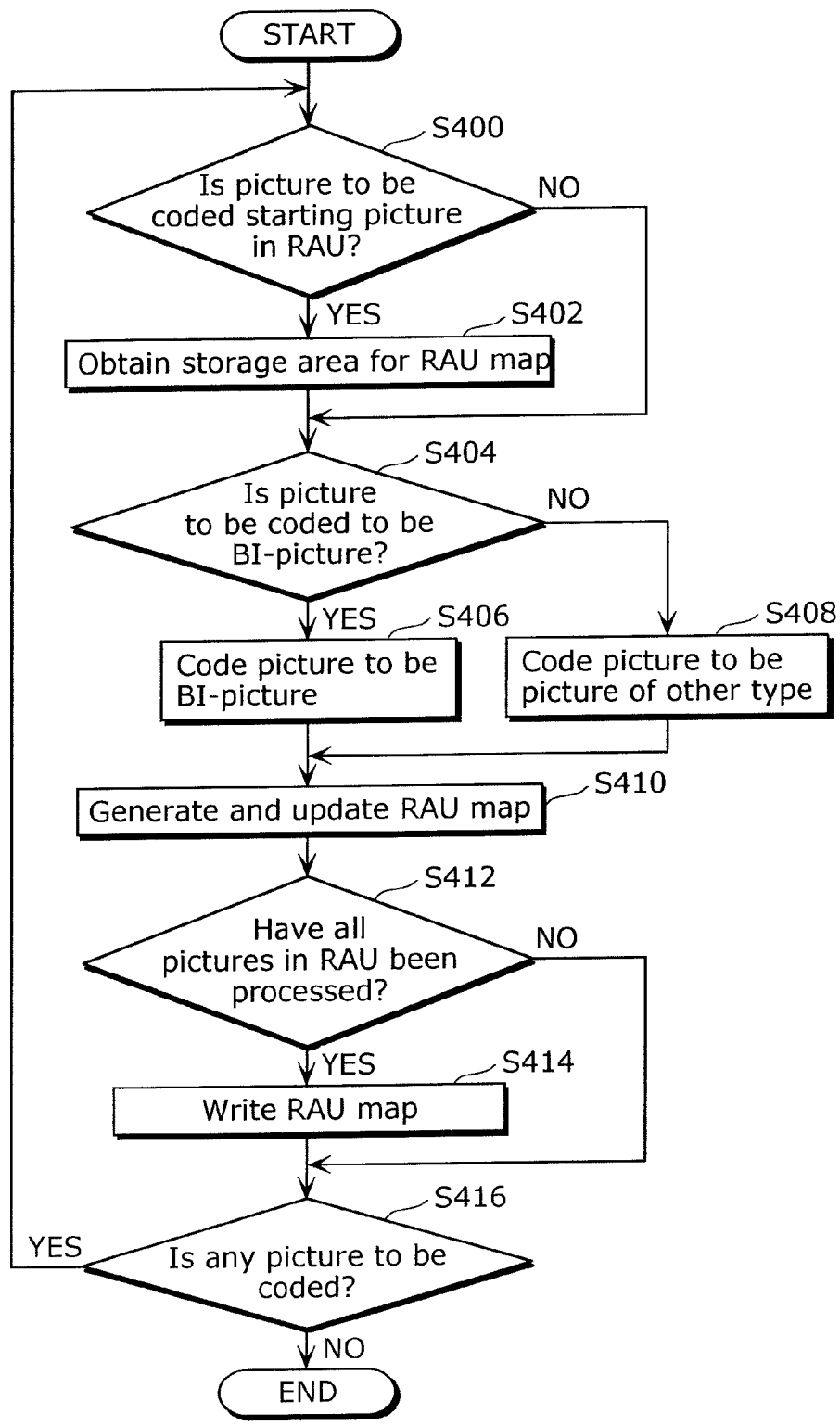
FIG. 26 is a flowchart showing operations which are performed by the picture coding apparatus according to the fourth embodiment of the present invention.

FIG. 26 is a flowchart showing operations which are performed by the picture coding apparatus 400 according to the fourth embodiment.

Firstly, the picture coding apparatus 400 determines, by using the prediction structure determination unit 412, whether or not a picture to be coded is a starting picture in a RAU (Step S400). Here, if the determination is made that the picture is the starting picture in the RAU (YES at Step S400), the picture coding apparatus 400 performs, by using the variable length coding unit 411, initialization processing to generate a RAU map MIa, and obtains an area for storing the RAU map MIa in user data of an entry point layer (Step 4202).

Furthermore, the picture coding apparatus 400 determines, by using the prediction structure determination unit 412, whether or not the picture to be coded is to be a BI-picture (Step S404). Here, if the determination is made that the picture is to be a BI-picture (YES at Step S404), then the picture coding apparatus 400 codes the picture to be coded as a BI-picture (Step S406). This means that, when the RAU to be coded is an open GOP type RAU in which pictures are allowed to refer to pictures in other access units, the picture coding apparatus 400 codes a picture to be coded thereby generating a BI-picture which is positioned in display order before a starting I-picture in the RAU of the stream STR and which does not refer to any other pictures. On the other hand, if the determination is made that the picture is not to be a BI-picture (NO at Step S404), then the picture coding apparatus 400 codes the picture to be coded as a picture of a different picture type (Step S408).

Then, the picture coding device 400, by using the BI information generation unit 413, generates and updates the RAU map MIa based on the determination result at Step S404 (Step S410).

For example, the picture coding apparatus 400 generates the RAU map MIa having syntax as shown in FIG. 9D so that the RAU map MIa can include: picture type information regarding the picture coded at Step S406 or S408; information indicating whether the picture is coded in a field structure or in a frame structure; and the like. As another example, the picture coding apparatus 400 generates the RAU map MIa as shown in FIG. 21 so that the RAU map MIa can clearly indicate a flag indicating whether or not there are one or more consecutive BI-pictures positioned in display order before the starting I-picture, and the number of such BI-pictures. In case of creating RAU map MIa shown in FIG. 21, RAU map can be completed after the coding of a starting I-picture in the RAU is determined, in other words, coding of all the BI-pictures that precede in display order the starting I-picture and follow in decoding order the starting I-picture is determined.

Next, the picture coding apparatus 400 determines whether or not the picture determined at Step S404 is a last picture in the RAU (Step S412). In other words, the picture coding apparatus 400 determines whether or not the processing has been performed for all pictures which are included in the RAU. Here, if the determination is made that the picture is a last picture (YES at S412), then the picture coding apparatus 400 specifies and codes the RAU map MIa using the variable length coding unit 411, and writes the RAU map MIa into the area obtained at Step S402 (Step S414).

Then, the picture coding apparatus 400 determines whether or not there are still pictures to be processed, among pictures included in the stream STR (Step S416). Here, if the determination is made that there is still a picture to be processed (YES at Step S416), then the picture coding apparatus 400 repeats operations from Step S400. On the other hand, if the determination is made that no picture to be processed is found (NO at Step S416), then the picture coding apparatus 400 completes all coding operations.

Note that, in the operations of FIG. 26, the RAU map storage area is previously obtained, but for example if there is a memory enough to buffer data such as the RAU, the RAU map data and the picture data may be stored in the memory and those data may be written into the storage media after determining the RAU map.

Fifth Embodiment

Furthermore, by recording a program for realizing the picture coding apparatus and the picture decoding apparatus described in the above embodiments, on a recording medium, such as a flexible disk, it is possible to easily implement the processing described in the above embodiments by an independent computer system.

Figure 27A:
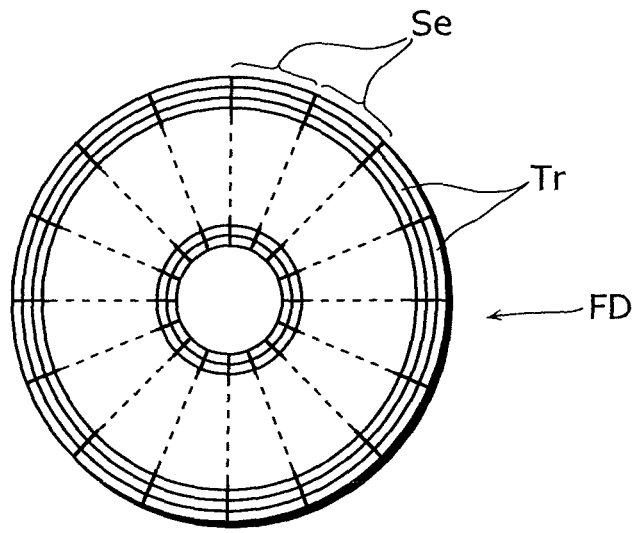
FIGS. 27A, 27B, and 27C are explanatory diagrams showing a storage medium which stores a program for realizing an image coding method and an image decoding method according to the present invention.
Figure 27B:
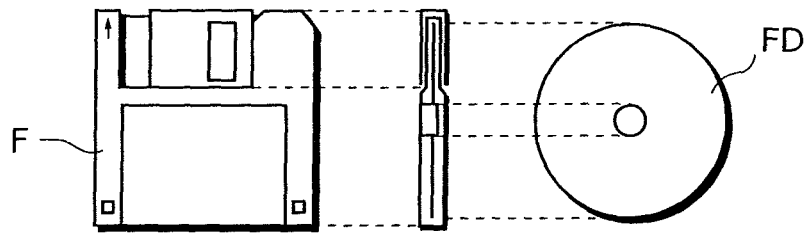
Figure 27C:
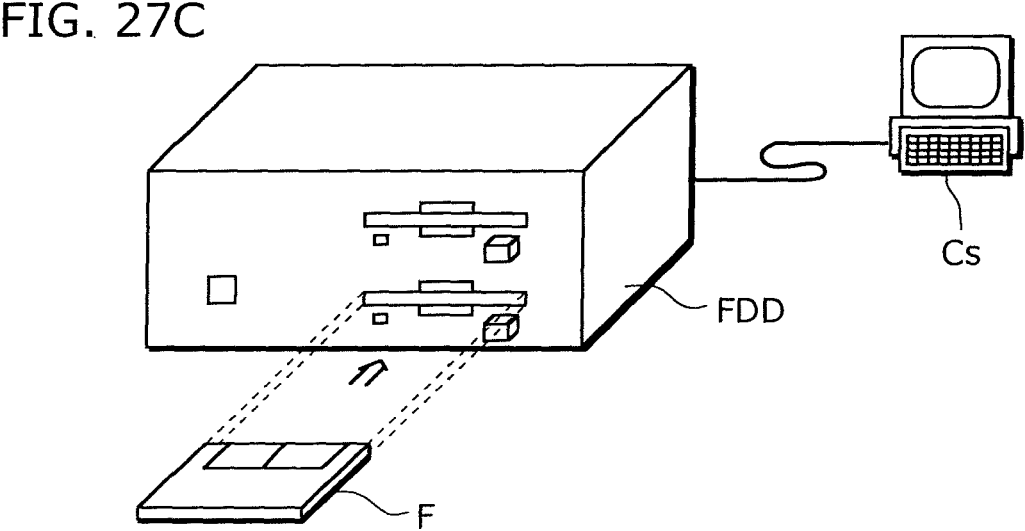

FIGS. 27A, 27B, and 27C are explanatory diagrams showing a case when the picture coding apparatus and the picture decoding apparatus described in above embodiments are realized by a computer system, by using a program which is recorded on a recording medium, such as a flexible disk.

FIG. 27B shows a front outside view of the flexible disk, a cross-sectional structure of the flexible disk, and a body of the flexible disk body. FIG. 27A shows an example of a physical format of the flexible disk body which is a main body of the recording medium. The flexible disk body FD is equipped in a case F, and a plurality of tracks Tr are formed on a surface of the disk from a circumference towards an internal circumference in a shape of concentric circles, and each track is segmented into sixteen sectors Se in an angle direction. Therefore, regarding the flexible disk storing the above program, the above program is recorded in an area allocated on the flexible disk body FD.

Furthermore, FIG. 27C shows a structure by which the flexible disk body FD records and play-backs the program. When the above program for realizing the picture coding apparatus and the picture decoding apparatus is recorded on the flexible disk body FD, the program is written from a computer system via a flexible disk drive FDD. Furthermore, when processing performed by the picture coding apparatus and the picture decoding apparatus is structured in the program system in the flexible disk, the program is read out from the flexible disk via the flexible disk drive, and transferred to the computer system Cs.

Note that the above explanation has described to use the flexible disk as a recording medium, but it is possible to use an optical disk instead. Note also that the recording medium is not limited to the above, but may be anything for enabling to record the program, such as an IC card and a ROM cassette.

As described above, according to the present invention, the picture coding apparatus adds the RAU map into a header of the RAU, and the picture decoding apparatus refers to the added RAU map before decoding each picture, so that it is possible to reduce decoding operations, and especially to improve play-back quality of a packaged media, in which a special play-back function is crucial. Therefore, the present invention has a high practical value.

As described above, the present invention has been described by using the above embodiments and the respective variations, but the present invention is not limited to the above. This means that, to realize the present invention, a person of ordinary skill in the art can combine the above embodiments and variations, or can combine the present invention with other well-known arts, as far as the combination is sensible.

Note that each functional block shown in the block diagrams (FIGS. 10 and 17, for example) is realized as a large scale integration (LSI) which is a typical integrated circuit. These functional blocks can be integrated separately, or a part or all of them may be integrated into a single chip (For example, functional blocks except a memory can be integrated as a single chip).

The integrated circuit can be called an IC, a system LSI, a super LSI or an ultra LSI depending on their degrees of integration.

The integrated circuit technique is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the enclosed functional blocks as an integrated circuit. For example, biotechnology, organic chemical technology, and the like can be applied to the above implementation.

Note that, among the functional blocks, only units for storing data to be coded or decoded is not integrated into the chip, but realized as a different function.

INDUSTRIAL APPLICABILITY

The picture coding apparatus and picture decoding apparatus according to the present invention can be applied, in play-backing the VC-1 stream and the like, to all devices which have a special play-back function, such as high-speed play-back, and is especially useful for optical disk peripheral devices in which the special play-back function is critical.

The invention claimed is:

1. A picture coding apparatus which generates a coded picture signal by coding each picture in each random access unit which includes one or more pictures, said picture coding apparatus comprising:
a coder operable to code, when the random access unit of the coded picture signal is an open type random access unit which is able to be coded by referring to another random access unit, a picture to be coded to generate an independent picture which is positioned, in the random access unit, in a display order before a starting picture that is positioned in a decoding order as a first picture, and which is able to be decoded independently without referring to any other picture;
an information generator operable to generate, when the random access unit is the open type random access unit, first supplementary information which indicates a picture type of each of pictures in the random access unit of the coded picture signal, and second supplementary information which indicates a structure of each of the pictures;
a generator operable to generate, when the random access unit is the open type random access unit, a stuffing bit so that a total bit number of the first supplementary information, the second supplementary information, and the stuffing bit is integral multiplication of eight bits; and
a writer operable to write, when the random access unit is the open type random access unit, the first supplementary information and the second supplementary information generated by said information generator and the stuffing bit generated by the generator into the random access unit of the coded picture signal,
wherein the first supplementary information is supplementary information indicating a picture type of each of the pictures, in the decoding order of the pictures in one of the random access units, and a picture type of at least one of the pictures is the independent picture, and
the second supplementary information is supplementary information for identifying the number of display fields when each of the pictures is displayed, in the decoding order of the pictures in one of the random access units, and the number of display fields varies among pictures in at least one random access unit for which the second supplementary information is written.

2. The picture coding apparatus according to claim 1, wherein said information generator is operable to generate the supplementary information which includes a flag indicating whether or not the independent picture is positioned in the display order immediately before the starting picture, and the number of the consecutive independent pictures positioned in the display order immediately before the starting picture.

3. The picture coding apparatus according to claim 1, wherein said writer is operable to write the supplementary information at a position before any picture included in the random access unit of the coded picture signal.

4. The picture coding apparatus according to claim 1, wherein said coder is operable to generate the independent picture which has characteristics in which the independent picture precedes in the display order a starting intra-coded picture in a random access unit and follows in the decoding order the starting intra-coded picture in the random access unit and in which all macroblocks in the independent picture are intra-coded, and to add information of a picture type indicating the characteristics into the independent picture.

5. A picture decoding apparatus which decodes a stream generated by the picture coding apparatus according to claim 1,
said picture decoding apparatus comprising:
a type determiner operable to determine whether or not the random access unit is an open type random access unit which is able to be decoded by referring to another random access unit;
an information obtainer operable to obtain the first supplementary information, the second supplementary information, and the stuffing bit from the random access unit, when said type determiner determines that the random access unit is the open type random access unit;
an extractor operable to extract from the random access unit a picture to be decoded by referring to the first supplementary information and the second supplementary information obtained by said information obtainer; and
a decoder operable to decode the picture extracted by said extractor,
wherein the first supplementary information is supplementary information indicating a picture type of each of the pictures, in the decoding order of the pictures in one of the random access units, and the picture type of the each of the pictures is one of an I-picture, a P-picture, a B-picture, and the independent picture, and
the second supplementary information is supplementary information for identifying the number of display fields when each of the pictures is displayed, in the decoding order of the pictures in one of the random access units, and the number of display fields varies among pictures in at least one random access unit for which the second supplementary information is stored.

6. The picture decoding apparatus according to claim 5, wherein said extractor is operable to
determine by referring to the supplementary information whether or not the independent picture is positioned in the display order immediately before the starting picture, and
extract the independent picture as the picture to be decoded when the determination is made that the independent picture is positioned in the display order immediately before the starting picture, and not to extract the independent picture as the picture to be decoded when the determination is made that the independent picture is not positioned in the display order immediately before the starting picture.

7. The picture decoding apparatus according to claim 6, wherein said supplementary information includes a flag indicating whether or not the independent picture is positioned in the display order immediately before the starting picture, and the number of the consecutive independent pictures positioned in the display order immediately before the starting picture, and
said extractor is operable to determine by referring to the flag and the number included in the supplementary information whether or not there are one or more consecutive independent pictures positioned in the display order.

8. The picture decoding apparatus according to claim 6, wherein the supplementary information indicates in the decoding order or in the display order a picture type of the picture included in the random access unit, and said extractor is operable to determine by referring to the picture type of the each picture indicated by the supplementary information whether or not there are one or more consecutive independent pictures positioned in the display order immediately before the starting picture;

extract from the pictures included in the random access unit the one or more consecutive independent pictures and pictures positioned in the display order after the independent pictures, as the pictures to be decoded, when the determination is made that there are the one or more consecutive independent pictures; and extract from the pictures included in the random access unit the starting picture positioned in the decoding order and pictures positioned in the display order after the starting picture, as the pictures to be decoded, when the determination is made that the one or more consecutive independent pictures do not exist.

9. A picture coding method of generating a coded picture signal by coding each picture in each random access unit which includes one or more pictures, said picture coding method comprising:

generating, when the random access unit of the coded picture signal is an open type random access unit which is able to be coded by referring to another random access unit, by coding a picture to be coded, an independent picture which is positioned, in the random access unit, in a display order before a starting picture that is positioned in a decoding order as a first picture, and which is able to be decoded independently without referring to any other picture;

generating, when the random access unit is the open type random access unit, first supplementary information which indicates a picture type of each of pictures in the random access unit of the coded picture signal, and second supplementary information which indicates a structure of each of the pictures;

generating, when the random access unit is the open type random access unit, a stuffing bit so that a total bit number of the first supplementary information, the second supplementary information, and the stuffing bit is integral multiplication of eight bits; and writing, when the random access unit is the open type random access unit, the first supplementary information and the second supplementary information generated in said generating supplementary information and the stuffing bit generated by the generating of the stuffing bit into the random access unit of the coded picture signal, wherein the first supplementary information is supplementary information indicating a picture type of each of the pictures, in the decoding order of the pictures in one of the random access units, and a picture type of at least one of the pictures is the independent picture, and the second supplementary information is supplementary information for identifying the number of display fields when each of the pictures is displayed, in the decoding order of the pictures in one of the random access units, and the number of display fields varies among pictures in at least one random access unit for which the second supplementary information is written.

10. A picture decoding method of decoding a stream generated by the picture coding method according to claim 9, said picture decoding method comprising:

determining whether or not the random access unit is an open type random access unit which is able to be decoded by referring to another random access unit;

obtaining the first supplementary information, the second supplementary information, and the stuffing bit from the random access unit, when said determination is made that the random access unit is the open type random access unit;

extracting from the random access unit a picture to be decoded by referring to the first supplementary information and the second supplementary information obtained in said obtaining; and decoding the picture extracted in said extracting, wherein the first supplementary information is supplementary information indicating a picture type of each of the pictures, in the decoding order of the pictures in one of the random access units, and the picture type of the each of the pictures is one of an I-picture, a P-picture, a B-picture, and the independent picture, and the second supplementary information is supplementary information for identifying the number of display fields when each of the pictures is displayed, in the decoding order of the pictures in one of the random access units, and the number of display fields varies among pictures in at least one random access unit for which the second supplementary information is stored.

11. A recording method for recording a coded picture signal on a non-transitory medium, the recording method generating the coded picture signal by coding each picture in each random access unit which includes one or more pictures and records the coded picture signal, said recording method comprising:

coding, when the random access unit of the coded picture signal is an open type random access unit which is able to be coded by referring to another random access unit, a picture to be coded to generate an independent picture which is positioned, in the random access unit, in a display order before a starting picture that is positioned in a decoding order as a first picture, and which is able to be decoded independently without referring to any other picture;

generating, when the random access unit is the open type random access unit, first supplementary information which indicates a picture type of each of pictures in the random access unit of the coded picture signal, and second supplementary information which indicates a structure of each of the pictures;

generating, when the random access unit is the open type random access unit, a stuffing bit so that a total bit number of the first supplementary information, the second supplementary information, and the stuffing bit is integral multiplication of eight bits; and writing, when the random access unit is the open type random access unit, the first supplementary information and the second supplementary information generated by said information generation unit and the stuffing bit generated by the generator into the random access unit of the coded picture signal; and recording the coded picture signal on the non-transitory medium, wherein the first supplementary information is supplementary information indicating a picture type of each of the pictures, in the decoding order of the pictures in one of the random access units, and a picture type of at least one of the pictures is the independent picture, and the second supplementary information is supplementary information for identifying the number of display fields when each of the pictures is displayed, in the decoding order of the pictures in one of the random access units, and the number of display fields varies among pictures in at least one random access unit for which the second supplementary information is written.

12. The recording method according to claim 11, wherein the generating generates the supplementary information which includes a flag indicating whether or not the independent picture is positioned in the display order immediately before the starting picture, and the number of the consecutive independent pictures positioned in the display order immediately before the starting picture.

* * * * *

UNITED STATES PATENT AND TRADEMARK OFFICE
CERTIFICATE OF CORRECTION

PATENT NO. : 9,497,483 B2  
APPLICATION NO. : 11/721479  
DATED : November 15, 2016  
INVENTOR(S) : T. Toma et al.

It is certified that error appears in the above-identified patent and that said Letters Patent is hereby corrected as shown below:

In the Claims

Column 35, Line 26 (Claim 1, Line 17) please change "of pictures" to -- of the pictures --

Column 35, Line 64 (Claim 3, Line 3) please change "picture included" to -- picture is included --

Column 37, Line 40 (Claim 9, Line 16) please change "of pictures" to -- of the pictures --

Column 38, Line 49 (Claim 11, Line 18) please change "of pictures" to -- of the pictures --

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*